(12) United States Patent
Goldman et al.

(10) Patent No.: US 8,667,402 B2
(45) Date of Patent: Mar. 4, 2014

(54) VISUALIZING COMMUNICATIONS WITHIN A SOCIAL SETTING

(75) Inventors: Daniel M. Goldman, Piedmont, CA (US); Lorne Lanning, Berkeley, CA (US)

(73) Assignees: Onset Vi, L.P., Menlo Park, CA (US); Javelin XIP, LLC, San Francisco, CA (US)

(*) Notice: Subject to any disclaimer, the term of this patent is extended or adjusted under 35 U.S.C. 154(b) by 80 days.

(21) Appl. No.: 12/986,547

(22) Filed: Jan. 7, 2011

(65) Prior Publication Data

US 2011/0225514 A1    Sep. 15, 2011

Related U.S. Application Data

(63) Continuation-in-part of application No. 12/969,487, filed on Dec. 15, 2010.

(60) Provisional application No. 61/312,542, filed on Mar. 10, 2010, provisional application No. 61/415,345, filed on Nov. 19, 2010, provisional application No. 61/415,348, filed on Nov. 19, 2010, provisional application No. 61/415,350, filed on Nov. 19, 2010, provisional application No. 61/415,351, filed on Nov. 19, 2010, provisional application No. 61/415,353, filed on Nov. 19, 2010, provisional application No. 61/415,344, filed on Nov. 19, 2010, provisional application No. 61/415,349, filed on Nov. 19, 2010, provisional application No. 61/415,346, filed on Nov. 19, 2010.

(51) Int. Cl.
*G06F 3/048* (2013.01)
*G06F 15/173* (2006.01)

(52) U.S. Cl.
USPC .................... 715/757; 715/706; 709/224

(58) Field of Classification Search
USPC .............. 715/757, 758, 753, 706; 709/224
See application file for complete search history.

(56) References Cited

U.S. PATENT DOCUMENTS

| | | | |
|---|---|---|---|
| 6,091,410 A | 7/2000 | Lection et al. | |
| 6,119,147 A | 9/2000 | Toomey et al. | |
| 6,200,138 B1 * | 3/2001 | Ando et al. | 434/61 |
| 6,215,498 B1 | 4/2001 | Filo et al. | |
| 6,227,974 B1 | 5/2001 | Eilat et al. | |
| 6,772,195 B1 * | 8/2004 | Hatlelid et al. | 709/204 |

(Continued)

OTHER PUBLICATIONS

Fernanda B. Viegas and Judith S. Donath, Chat Circles, May 15-20, 1999, MIT Media Lab.*

(Continued)

*Primary Examiner* — Doug Hutton, Jr.
*Assistant Examiner* — Li Sun
(74) *Attorney, Agent, or Firm* — Eric W. Cernyar; James W. Huffman

(57) ABSTRACT

A method is provided for visualizing communications in a social setting. A graphical virtual social venue is provided. Users of one or more social networks are invited to enter the venue and to participate in and share a social experience. Users are graphically represented within the virtual social venue and are able to communicate with each other. When users communicate with each other, the communications are tracked and visually represented in the virtual social venue with visual overlays. The visual overlays signify communicatively active parts of the social venue while keeping private the contents of the communication.

14 Claims, 20 Drawing Sheets

(56) References Cited

U.S. PATENT DOCUMENTS

| | | | |
|---|---|---|---|
| 6,784,901 B1 * | 8/2004 | Harvey et al. | 715/757 |
| 7,286,799 B2 * | 10/2007 | Thrasher | 455/41.2 |
| 7,346,654 B1 * | 3/2008 | Weiss | 709/204 |
| 7,386,799 B1 | 6/2008 | Clanton et al. | |
| 7,468,729 B1 | 12/2008 | Levinson | |
| 7,487,047 B2 | 2/2009 | Wood | |
| 7,720,784 B1 | 5/2010 | Froloff | |
| 7,840,668 B1 * | 11/2010 | Sylvain et al. | 709/224 |
| 7,974,983 B2 | 7/2011 | Goeldi | |
| 8,191,001 B2 * | 5/2012 | Van Wie et al. | 715/757 |
| 8,271,905 B2 | 9/2012 | McNeill | |
| 2002/0007314 A1 | 1/2002 | Maruyama | |
| 2003/0154486 A1 | 8/2003 | Dunn et al. | |
| 2003/0156135 A1 | 8/2003 | Lucarelli | |
| 2004/0004631 A1 | 1/2004 | Debique et al. | |
| 2004/0051745 A1 | 3/2004 | Gargi | |
| 2004/0061718 A1 * | 4/2004 | Fitzpatrick et al. | 345/758 |
| 2004/0179038 A1 | 9/2004 | Blattner et al. | |
| 2005/0010637 A1 | 1/2005 | Dempski et al. | |
| 2005/0064926 A1 | 3/2005 | Walker et al. | |
| 2005/0114121 A1 | 5/2005 | Tsingos et al. | |
| 2005/0228785 A1 | 10/2005 | Wolcott et al. | |
| 2006/0010199 A1 | 1/2006 | Brailean et al. | |
| 2006/0148568 A1 | 7/2006 | Schultz et al. | |
| 2006/0224546 A1 | 10/2006 | Ballin et al. | |
| 2007/0006060 A1 | 1/2007 | Walker | |
| 2007/0011617 A1 | 1/2007 | Akagawa et al. | |
| 2007/0024002 A1 | 2/2007 | McMain et al. | |
| 2007/0060312 A1 | 3/2007 | Dempsey et al. | |
| 2007/0075993 A1 | 4/2007 | Nakanishi et al. | |
| 2007/0117636 A1 | 5/2007 | Takahashi et al. | |
| 2007/0160961 A1 | 7/2007 | Lum | |
| 2007/0162863 A1 | 7/2007 | Buhrke et al. | |
| 2007/0169165 A1 | 7/2007 | Crull et al. | |
| 2007/0179867 A1 | 8/2007 | Glazer et al. | |
| 2007/0266304 A1 | 11/2007 | Fletcher et al. | |
| 2008/0079752 A1 | 4/2008 | Gates et al. | |
| 2008/0146302 A1 | 6/2008 | Olsen et al. | |
| 2008/0200224 A1 | 8/2008 | Parks | |
| 2008/0204448 A1 | 8/2008 | Dawson et al. | |
| 2008/0222295 A1 | 9/2008 | Robinson et al. | |
| 2008/0268929 A1 | 10/2008 | Billmaier et al. | |
| 2008/0320159 A1 | 12/2008 | Naimark et al. | |
| 2009/0013263 A1 * | 1/2009 | Fortnow et al. | 715/753 |
| 2009/0016449 A1 | 1/2009 | Cheung et al. | |
| 2009/0063041 A1 * | 3/2009 | Hirose et al. | 701/209 |
| 2009/0063283 A1 | 3/2009 | Kusumoto et al. | |
| 2009/0063983 A1 | 3/2009 | Amidon et al. | |
| 2009/0106671 A1 | 4/2009 | Olson et al. | |
| 2009/0119604 A1 | 5/2009 | Simard et al. | |
| 2009/0241037 A1 | 9/2009 | Hyndman | |
| 2009/0253512 A1 | 10/2009 | Nickell et al. | |
| 2009/0254358 A1 | 10/2009 | Li et al. | |
| 2009/0259648 A1 | 10/2009 | Bokor et al. | |
| 2009/0259948 A1 | 10/2009 | Hamilton, II et al. | |
| 2009/0288007 A1 * | 11/2009 | Leacock et al. | 715/716 |
| 2010/0030578 A1 | 2/2010 | Siddique et al. | |
| 2010/0115426 A1 * | 5/2010 | Liu et al. | 715/757 |
| 2010/0146407 A1 | 6/2010 | Bokor et al. | |
| 2010/0169799 A1 | 7/2010 | Hyndman et al. | |
| 2010/0180001 A1 | 7/2010 | Hardt | |
| 2010/0205543 A1 | 8/2010 | Von Werther et al. | |
| 2010/0306655 A1 | 12/2010 | Mattingly et al. | |
| 2010/0325218 A1 | 12/2010 | Castro et al. | |
| 2011/0063287 A1 | 3/2011 | McNeill | |
| 2011/0106662 A1 | 5/2011 | Stinchcomb | |
| 2011/0126132 A1 | 5/2011 | Anderson et al. | |
| 2011/0131507 A1 | 6/2011 | Butcher | |
| 2011/0207513 A1 | 8/2011 | Cross et al. | |
| 2011/0208814 A1 | 8/2011 | Bostrom et al. | |
| 2012/0265806 A1 | 10/2012 | Blanchflower et al. | |
| 2012/0304127 A1 | 11/2012 | McNeill | |
| 2013/0065656 A1 | 3/2013 | Parks | |
| 2013/0073389 A1 | 3/2013 | Heath | |
| 2013/0073473 A1 | 3/2013 | Heath | |

OTHER PUBLICATIONS

Nintendo, Wii Sports, Nov. 19, 2006, www.nintendo.com/games/detail/1OTtO06SP7M52gi5m8pD6CnahbW8CzxE, wiisports.nintendo.com/games_section/ pp. 1-2.

Karoussos, Katerina. "MII & YOU" DIMEA 2008, Sep. 10-12, 2008, Athens, Greece pp. 496-498.

"Wii Operations Manual; Channels and Settings." Nintendo, 2009, pp. 6-8 and 11-13.

Yoono Browser Add-on, "So How Does Yoono Simplify My Life?" Jan. 14, 2010, http://yoono.com/features.html pp. 1-5.

Schonfeld, Erick. "Qlipso Brings Avatars, Video Chat, and FaceBook Connect to Virtual Room." pp. 1-2, Nov. 18, 2009, retrieved from http://techcrunch.com/2009/11/18/qlipso-virtual-rooms-avatars-video-chat-facebook/.

Morin, Dave. "Announcing Facebook Connect." p. 1. May 9, 2008, retrieved from http://developers.facebook.com/blog/post/2008/05/09/announcing-facebook-connect/.

* cited by examiner

2600

VISUALIZING COMMUNICATIONS WITHIN A SOCIAL SETTING

CROSS REFERENCE TO RELATED APPLICATION(S)

This application claims the benefit of the following U.S. Provisional Applications which are hereby incorporated by reference in their entirety for all intents and purposes:

| Ser. No. | Filing Date | Title |
|---|---|---|
| 61/312,542 | Mar. 10, 2010 | MANIFESTING SOCIAL MEDIA EVENTS IN A SOCIAL MEDIA PLATFORM |
| 61/415,345 | Nov. 19, 2010 | INCORPORATING MULTIPLE WEB BROWSERS INTO A 3D PLATFORM CONNECTED TO SOCIAL NETWORKS FOR DISPLAYING REAL-TIME CONTENT FROM THE SOCIAL MEDIA NETWORKS |
| 61/415,348 | Nov. 19, 2010 | DYNAMICALLY LOADING CONTENT FROM MULTIPLE NETWORKS INTO A 3D SOCIAL MEDIA ENVIRONMENT |
| 61/415,350 | Nov. 19, 2010 | RENDERING SOCIAL MEDIA COMMUNICATIONS AS REAL-TIME GRAPHICAL INTERACTIONS IN A 3D SPACE |
| 61/415,351 | Nov. 19, 2010 | IMPORTING AND OVERLAYING GRAPHICAL IMAGES ONTO INTERACTIVE AVATARS WITHIN A VIRTUAL SOCIAL ENVIRONMENT |
| 61/415,353 | Nov. 19, 2010 | PRIORITIZING A SEMI-PERSISTENT USER PROFILE WITHIN A 3D PLATFORM |
| 61/415,344 | Nov. 19, 2010 | MECHANISM FOR INSTANTIATING MEDIA CONTENT INTO A SOCIAL NETWORKING VENUE FROM AN INTERNET BROWSER |
| 61/415,349 | Nov. 19, 2010 | INSTANTIATION OF WIDGETS WITHIN DISPLAYS IN A 3D SOCIAL VENUE ENVIRONMENT |
| 61/415,346 | Nov. 19, 2010 | METHOD FOR USER IDENTIFICATION OF CONTENT WITHIN DISPLAYS IN A 3D SOCIAL VENUE ENVIRONMENT |

This application is a continuation-in-part of U.S. patent application Ser. No. 12/969,487, filed Dec. 15, 2010 entitled "INCORPORATING MEDIA CONTENT INTO A 3D SOCIAL PLATFORM", assigned to a common assignee, the contents of which are hereby incorporated by reference in their entirety for all intents and purposes:

FIELD OF THE INVENTION

The present invention relates to a platform for providing social networking services within a virtual venue to allow for interaction between users with third-party media content, and more specifically to a method for instantiating viewable media into a three-dimensional platform.

BACKGROUND OF THE INVENTION

People utilize computers to access or generate information, to produce content, to communicate with others, to experience media (music, television, movies, or other video), and to play games. However, multiple users do not share most computer experiences, because they are isolated from each other in terms of geography, chronology, or with respect to the content that they access. Whatever activity a computer user experiences is typically either asynchronous to other users (such as email, viewing and posting within a social network service, etc.), or synchronous within a closed environment (such as online gaming). Alternatively, the activity is entirely personal, such as viewing a movie, watching a sporting event via a web feed, or laughing at the latest YOUTUBE® post.

The last few years have witnessed the rise of online social networks to connect people with friends, acquaintances, and enable them to share interests, pictures, videos, emails, and the like. A typical online social network provides a representation of each user (often a profile), his/her social links, and a variety of services, including means for users to interact over the internet, such as e-mail and instant messaging. Social networking sites allow users to share ideas, activities, events, and interests within their individual networks.

However, such social networking sites are typically asynchronous. That is, users access network services on their schedule, and review activities, events and interests that have been previously posted by other users within their network. And, if they add content or dialogue to their network, other users will see such posting at a later time, when they access the network.

By contrast, online gaming services connect people in a synchronous fashion. That is, gamers go online and share a gaming experience with each other at the same time. However, the form of the shared content is predefined: the game that the users are playing. The online games are closed systems, where the content that is experienced by the users is predefined within the gaming environment. Moreover, the persons with whom the content is shared is also closed and restricted to members involved in the game.

SUMMARY OF THE INVENTION

A method is provided for visualizing communications in a social setting. A graphical virtual social venue is provided. Users of one or more social networks are invited to enter the venue and to participate in and share a social experience. Users are graphically represented within the virtual social venue and are able to communicate with each other. When users communicate with each other, the communications are tracked and visually represented in the virtual social venue with visual overlays. The visual overlays signify communicatively active parts of the social venue while keeping private the contents of the communication.

In one embodiment, the visual overlays comprise color-coded streams or ribbons of light. For example, a linear stream or ribbon of blue light is used to represent intra-venue communications. A linear stream or ribbon of blue light connects the avatars of two users within the virtual social venue that are communicating with each other. A vertical stream or ribbon of red light is used to represent trans-venue communications. When a user communicates with someone outside the venue, a vertical stream or ribbon of red light dropping down from outside the venue onto the user is used to represent the communication.

In another embodiment, the communications tracked in the virtual social venue are communications made between users through their social networks. For example, the communications may comprise posts or chats between users of a social network. Alternatively, the communications may comprise live voice communications to or from users within the social venue.

In another embodiment, a virtual three-dimensional representation is provided of the virtual social venue, in the form of a stadium, coliseum, arena, stage, theater, or other large physical structure providing a seating or standing area for seating or standing a plurality of people in proximity to each other to view and/or listen to streaming media content. Also, three dimensional avatars are provided to each user who enters the virtual social venue to graphically represent the user within the venue.

Users can also migrate their avatars over to communicatively active parts of the social venue. In one embodiment, as users migrate over to what the visual overlays show to be a communicatively active part of the social venue, to the extent that the communications comprise live voice communications, they gradually become audible to the migrating users as they come into proximity with the communicating users. In another embodiment, text communications from a text-sending user are converted to audio and made audible to users proximate the text-sending user.

DETAILED DESCRIPTION OF THE INVENTION

The present invention is directed at taking all of the experiences that are possible for a user on his/her computer, whether browsing content, enjoying video, gaming, or obtaining information, and placing such experiences on a platform that integrates the experiences within the context of a social network.

Figure 1:
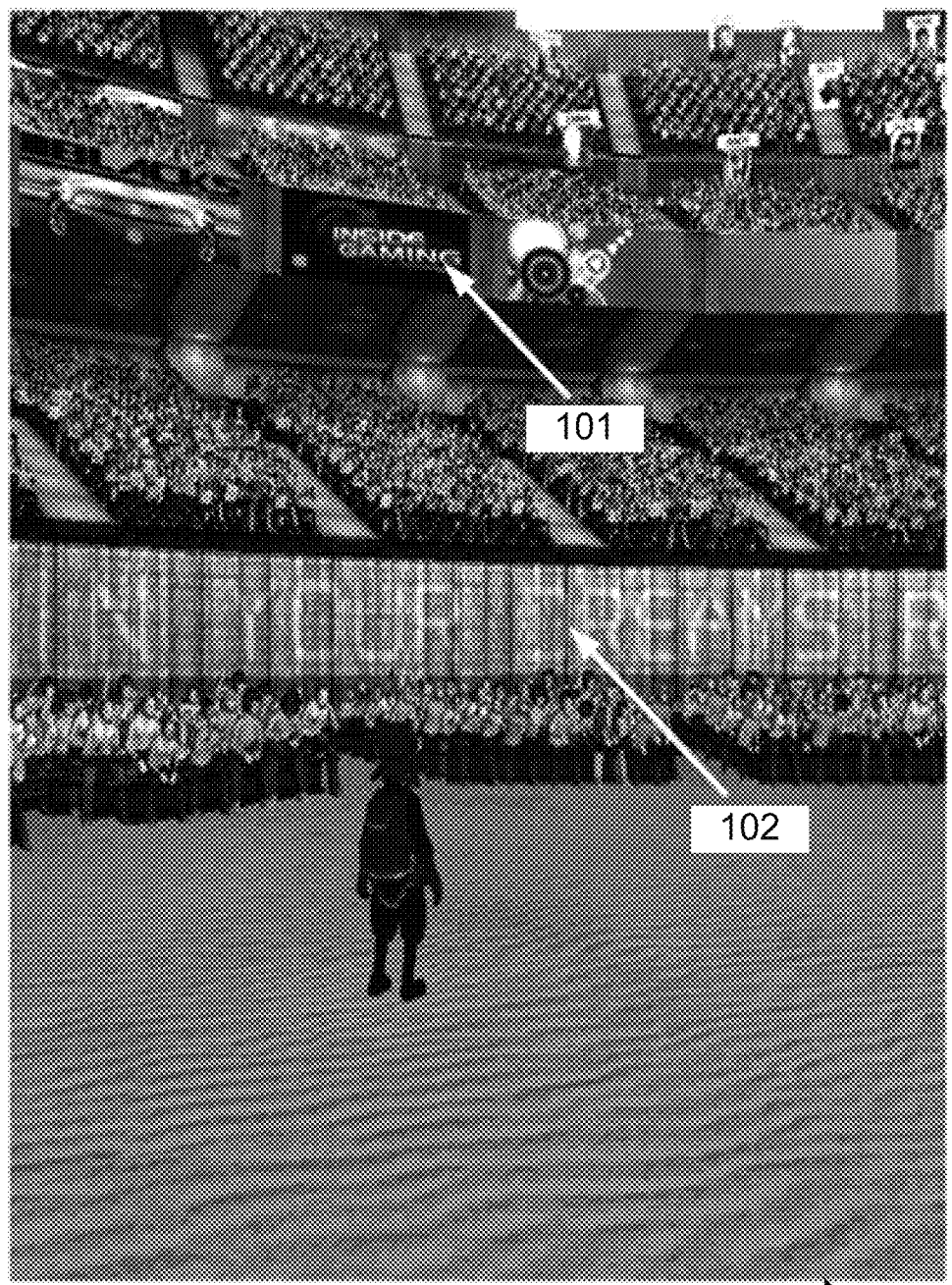
FIG. 1 is a screenshot of one embodiment of a three-dimensional virtual social venue with a plurality of viewing surfaces on which extrinsically-sourced two-dimensional content is displayed.

FIG. 1 is a screenshot of one embodiment of a virtual social venue 100 for instantiating extrinsically-sourced media content. The virtual social venue 100 comprises a virtual three-dimensional space—in the illustrated case—a large stadium, for hosting a large gathering of people. The virtual social venue 100 provides a plurality of virtual screens, windows, or other viewing surfaces within the virtual three-dimensional space on which to instantiate various streams of extrinsically-sourced media content. FIG. 1 illustrates a plurality of elevated billboards 101 installed between seating levels of the stadium and large floor-level jumbotron video display 102 wrapping around a field or stage. The billboards 101 and video display 102 are displaying various streams of instantiated media content.

Figure 2:
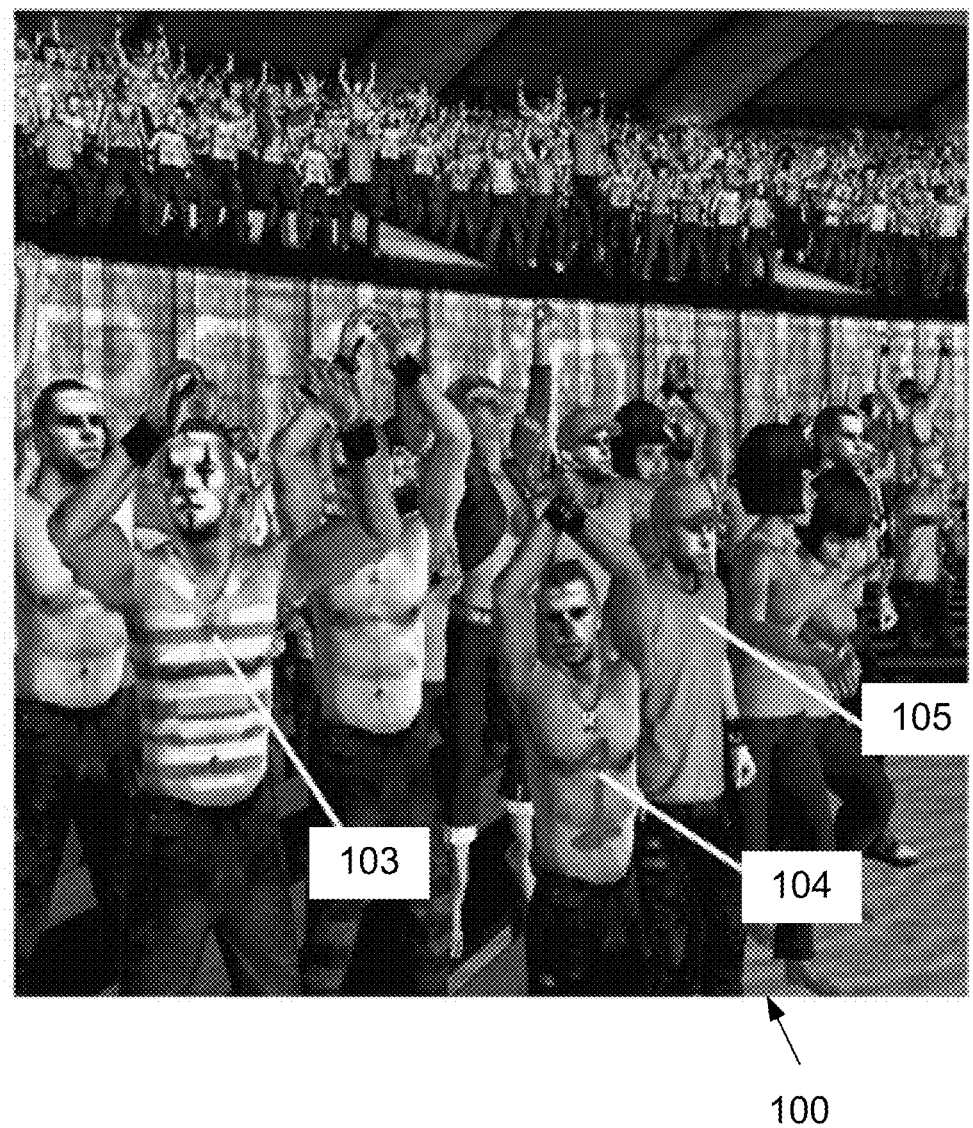
FIGS. 2 and 3 are additional screenshots of groups of socially interacting avatars in the virtual social venue of FIG. 1

FIG. 2 illustrates the virtual social venue 100 populated with representations of users admitted from one or more social networks, as well as representations of artificial intelligence (AI) controlled characters. In FIG. 2, the representations are in the form of three-dimensional animated avatars. Representations may alternatively take any form preferred by the user. In some embodiments, seats or standing locations in the virtual social venue 100 are automatically and intelligently assigned to cluster users together as they enter the venue. In other embodiments, a moderator or host assigns seats or standing locations to invited users. In yet other embodiments, seats or standing locations are sold or auctioned based upon the relative desirability of the seats. In yet further embodiments, users have the ability and privilege to navigate through the virtual social venue 100 and migrate to unoccupied seats or standing locations that the users select. A user can change seats by double clicking on an empty seat, hitting keys to migrate over to an empty seat, or requesting to sit near someone. In the preferred embodiments, multiple avatars cannot occupy the same seat or other spatial position within the virtual social venue, but a single avatar (particularly an advertising avatar) may be able to occupy multiple locations simultaneously.

The virtual social venue 100 enables users to express emotional and/or social responses to the media content they are experiencing, as well as to the activities going on in their virtual environment. The virtual social venue 100 also enables users to interact with the other avatars and participants. Examples of emotional responses and social interactions include but are not limited to standing, waving, booing, cheering, and clapping.

Figure 3:
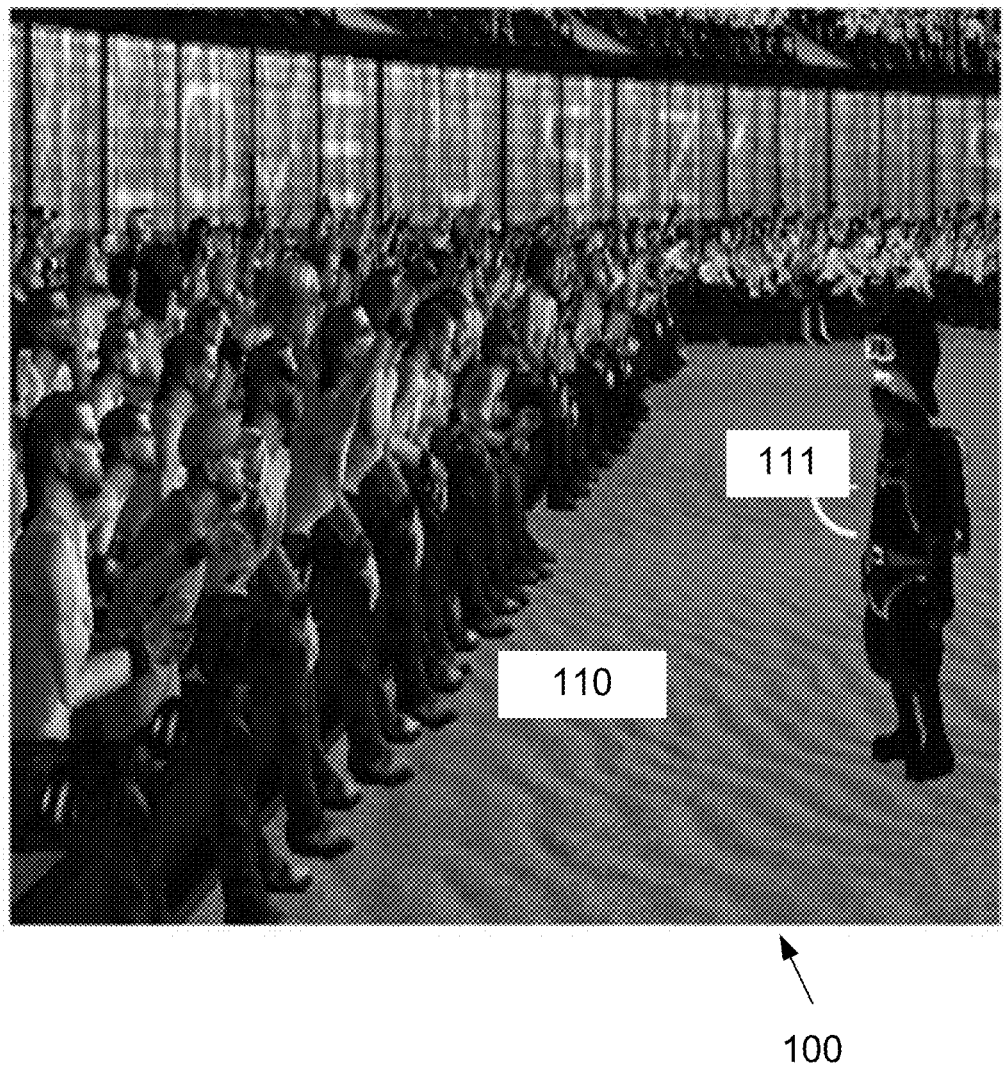

FIG. 2 depicts avatars reacting as a mob and individually. For example, in the illustrated embodiment, all three avatars 103, 104 and 105 are standing on their feet and reacting to some event as a mob. However, avatar 105 is reacting differently than avatars 103 and 104 at the moment the screen shot was taken. These avatars also perform actions responsive to the participants' controls or other actions or events occurring within the virtual social venue 100. FIG. 3 depicts an example of a mob of avatars 110 reacting to the participant's avatar 111.

Many different types of avatars are contemplated. Some of the avatars are live avatars controlled by users admitted to and participating in the virtual social venue 100. Other avatars are ghost avatars—avatars that were previously controlled by users but that are now programmed to replay the emotional reactions and animations with which the users had previously caused them to act out. Yet other avatars are artificial-intelligence controlled avatars that are programmed to respond in a manner consistent with the live avatars and ghost avatars in proximity to them. For example, if a live avatar expresses a positive emotion, such as clapping, nearby AI avatars may express positive reactions such as cheering or whistling. Likewise, if a live avatar expresses a negative emotion, such as booing, nearby AI avatars may express other negative reactions that are consistent with the live avatar's booing. In this way, crowd dynamics are simulated within the virtual social forum. In another embodiment, participants may enter and control various AI avatars with which they come into contact.

FIGS. 2-3 illustrate social interactions taking place within a virtual social venue embodied as a virtual structure, and more particularly, as a stadium, coliseum or arena. Other embodiments of virtual social venues include theaters, stages, conference buildings, and other gathering places. In at least one embodiment, participants with social connectivity can engage in collaborative social activities within the virtual social venue. For example, participants can decide to watch a particular video feed on a display screen in the virtual coliseum within the virtual social venue. The video feed may be a movie, TV series, or any other video content.

Based upon his or her seating or standing location within the three-dimensional virtual social venue 100, each user has a unique position and orientation—and corresponding perspective and field of view—within the virtual three-dimensional space. When media content is instantiated onto a viewing surface 101 or 102 within the three-dimensional space, it is scaled, rotated to a yaw and pitch, and depth-transformed consistent with the relative differences between the user's position and orientation and the viewing surface's position and orientation. This three-dimensional transformation is unique to each user, so it is preferably managed by each user's own client-side hardware resources.

Figure 4:
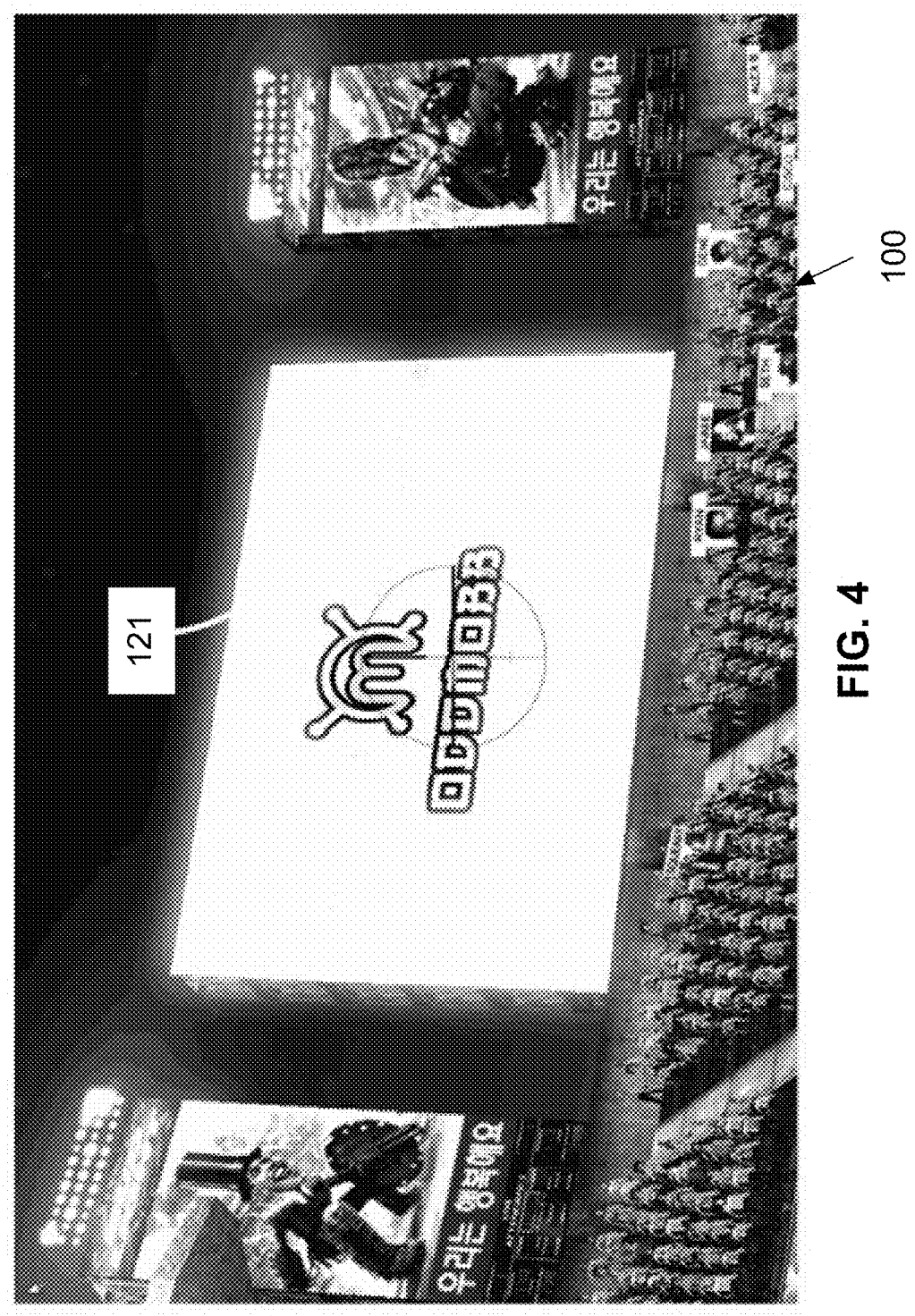
FIG. 4 is a screenshot of one of the billboard displays in the virtual social venue of FIG. 1, and illustrates the three-dimensional transformation that is applied to two-dimensional media instantiated in the virtual social venue.

FIG. 4 depicts an example of a video screen 121 within the virtual social venue 100 that has been scaled, rotated and depth-transformed to match a user's perspective. The same video or other media is also streamed to other participants to watch, but scaled, rotated and depth-transformed to match those participant's unique perspectives.

Figure 5:
FIG. 5 is a close-up, zoomed-in screenshot of the billboard display of FIG. 1.

Each participant's view can be adjusted to zoom in and out of the video screen 121 so that each participant can watch a full-screen version of the video feed with other participants if desired. FIG. 5 depicts zooming into a nearly full-screen version of the video screen 121. Further zooming would transform the video screen 121 into a non-rotated (fully orthogonal) full-screen view of the media content. Also, once the participant zooms into the screen, additional content may be displayed, such as content 511. Each participant can also zoom back out from a full-screen view, enabling the participant to select the relative amount of attention to distribute between the media content and the social environment.

Each participant can also enlarge their default field of view by zooming out far enough to see their own avatar and the surrounding environment. By zooming out this way, the participant can gain a bird's-eye view of the virtual social venue, and identify (and migrate to) areas that appear to be more lively and active than others.

To enhance the social experience, audio content streamed into the virtual social venue is mixed with ambient audio expressions (such as shouting, booing, clapping, or real voice expressions) from the participants. The audio content streamed into the virtual world may also be mixed with attenuated sounds from other media content being instantiated on nearby viewing surfaces. The audio is also preferably streamed to each participant in a 3-D, surround-sound format, with ambient sounds from surrounding sources being attenuated and delayed as a function of the distance between the user's avatar and the source of the sound. In one embodiment, zooming into a full-screen version of the video screen 121 has the concomitant effect of attenuating ambient sounds (until the ambient sounds are turned off) and making the media content relatively louder. Zooming out has the opposite effect, increasing the relative loudness of the ambient sounds. In other embodiments, the ambient sounds one hears are limited to certain channels or groups of friends.

Many different forms of media content may be instantiated into the virtual social venue 100. In one embodiment, a fully-interactive web page is instantiated on a viewing surface within the virtual social venue. Interactivity with the webpage, however, is preferably limited to a host who instantiates the web page or to a virtual disc jockey who is given control over the media content. In other embodiments, described below, a video stream or widget is instantiated onto the viewing surface.

Figure 6:
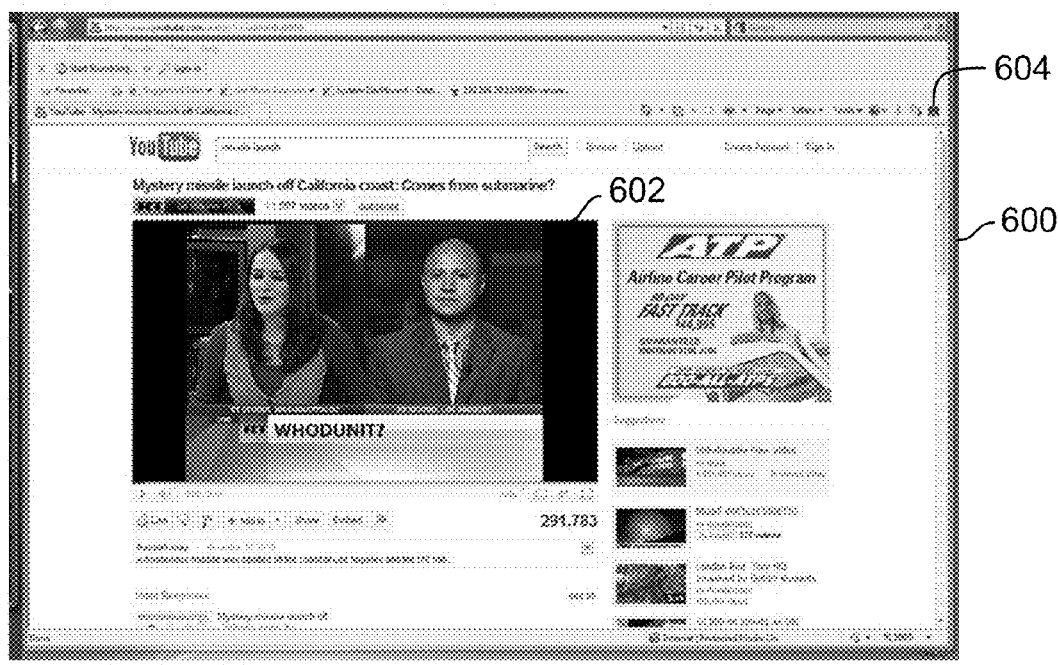
FIG. 6 is a screenshot of a web page that is external to the virtual social venue of FIG. 1.

FIG. 6 illustrates a screen shot 600 of a web browser that is viewing media content on a computer display. The screen shot 600 includes video content 602 being displayed from the YouTube™ web site. A browser plugin icon 604 is provided on the toolbar of the browser. After video content is selected within the browser, a user with hosting privileges for a virtual social venue can click on the browser plugin icon 604. The plugin 604 causes whatever video is being presented within the browser, to also be instantiated and played within the venue. Alternatively, the plugin 604 causes the media content to be placed into a queue for later presentation within the social venue, before streaming the media content to the multiple users participating in the virtual social venue.

Figure 7:
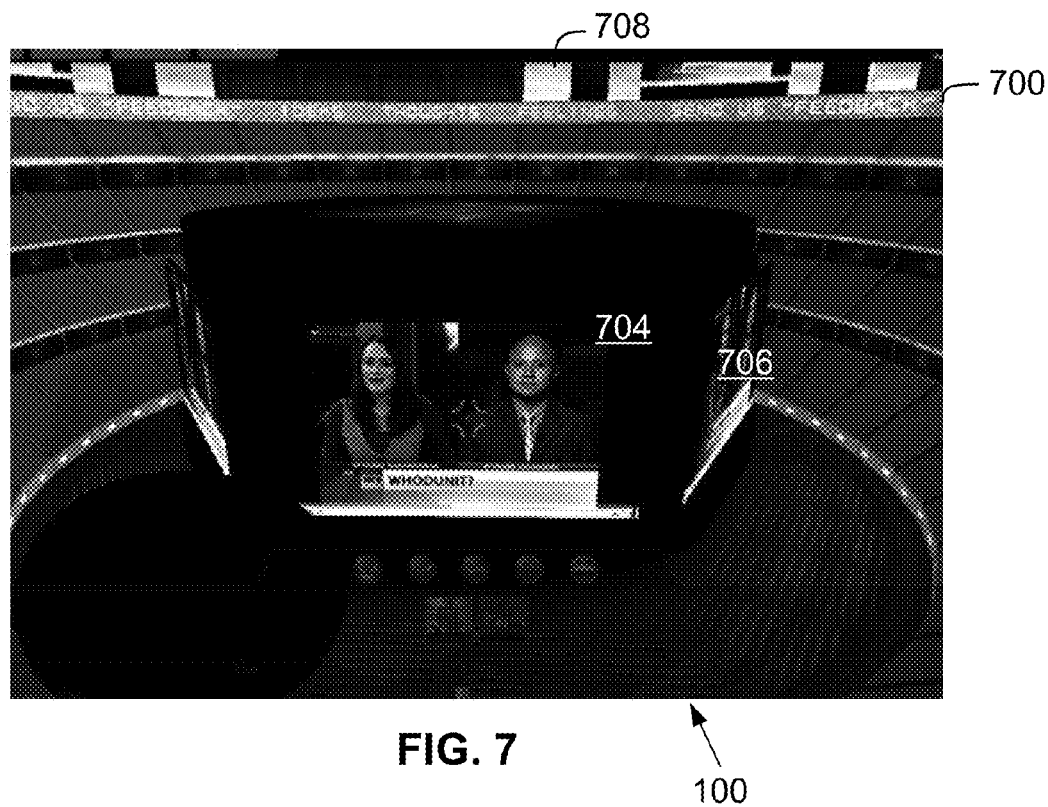
FIG. 7 is a screenshot of the web site of FIG. 6 instantiated into the social venue.

Referring to FIG. 7, a screen shot 700 is provided depicting a multi-sided jumbotron monitor 704 on which the video content 602 is instantiated. Once the video content 602 is instantiated into the virtual social venue 100, the media that is being played is not just viewed by the user that caused the instantiation. Rather, every participant that is within the virtual social venue 100, whether from the user's social network, or otherwise within the venue, has the instantiated video content 602 presented to them within the context of the venue, provided that the viewing screen is within that participant's field of view. Thus, the experience of observing the video content 602 is enjoyed by all members of the venue.

In addition, the selection of the monitor 704 onto which to instantiate a given media stream is customizable. That is, the video content 602 could have been displayed on the monitor 706, or even one of the remote monitors 708. The choice of location for displaying externally instantiated video content 602 is definable by either the user who selected the content, or by individual users within the virtual social venue 100.

Additionally, each user within the venue 100 may select one or more viewing spaces for the instantiated video content. For example, a first user may wish to view the video content 602 on the jumbotron 704. A second user may wish to view the content on the monitor 708. Mechanisms are provided to allow users to move content between display areas, as well as to queue instantiated content for later viewing. Additionally, different users in a venue may be given different rolls: owner, administrator, moderator, spectators and guests. Each of these user types have different privileges and controls available to them for instantiating or moving content from external sources.

In another embodiment, the browser plugin icon 604 may be used by an owner, administrator or moderator, to queue up content for display in a later venue. Thus, a user can surf the web in his/her browser, and when they find desired content, can use the browser plugin 604 to add media content to a queue, for later play. When the venue experience begins, the content can then be placed into displays as desired.

Figure 8:
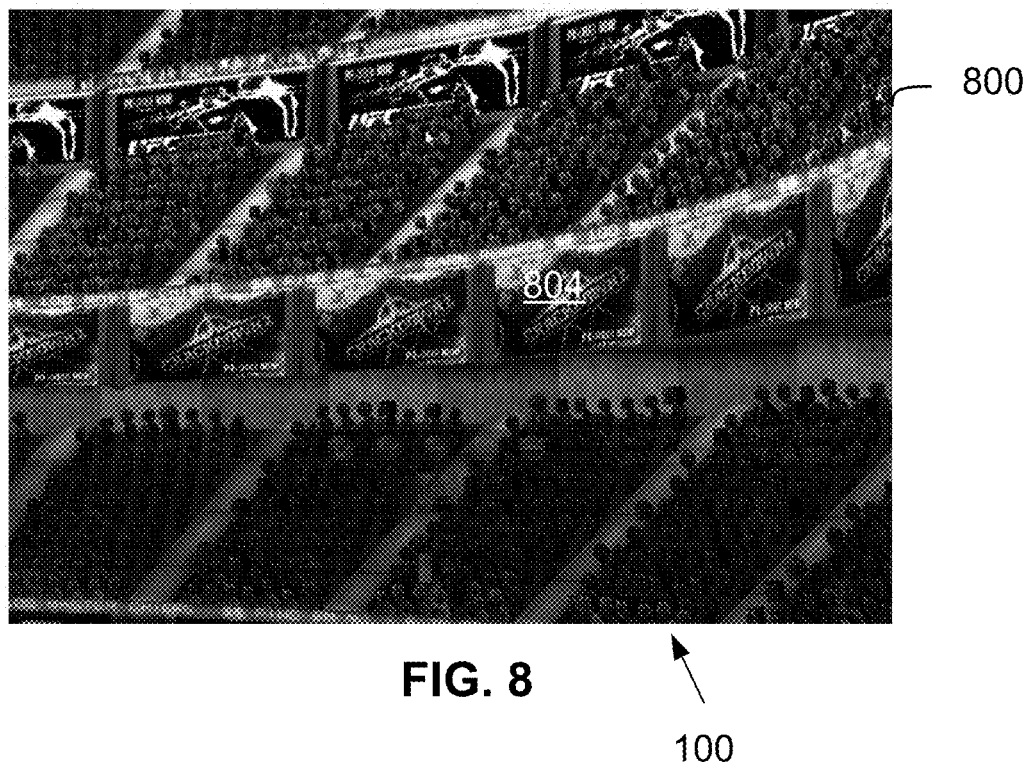
FIG. 8 is a screenshot of another portion of the virtual social venue of FIG. 1, depicting monitors that display merchandise for sale.

FIG. 8 illustrates a screen shot 800 depicting another portion of the virtual social venue 100. The venue 100 includes a plurality of billboards 804. As described above, the billboards 804 are placeholders for content, whether still pictures, data, or video. In addition, the billboards 804 may feed content into the venue 100, either individually, where each billboard 804 contains different content, or collectively, where each billboard 804 contains the same content. Moreover, the content within each billboard 804 may be populated and managed by any one of the plurality of user types described above.

In one embodiment, the content within the billboards 804 may contain advertisements that are related to the content that is being viewed within the venue 100. For example, if the content that is being experienced by the social group within the venue 100 is a video game, billboards 804 may "advertise" similar video games, or pre-orders for games not yet released. If the video content being experienced within the venue 100 is a movie, billboards 804 may display trailers to movies that are similar to that being viewed, or movies by the same director, or having the same primary actors/actresses. The uses available for the billboards 804 are not restricted, and may relate directly or indirectly to the content being experienced within the venue 100.

Figure 9:
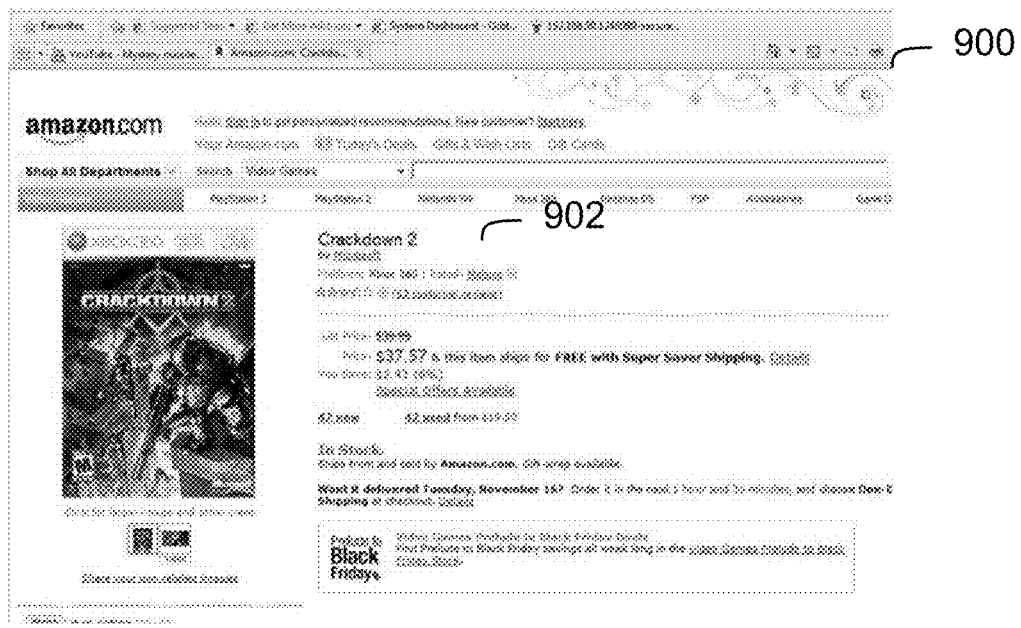
FIG. 9 is a screenshot of a point-of-sale web page that is launched when a user selects one of the merchandise advertising monitors of FIG. 8.

FIG. 9 illustrates a screen shot 900 of an online merchant where merchandise 902 advertised in the billboard 804 is shown. In one embodiment, a user within the venue 100 that wants to purchase merchandise that is advertised on the billboard 804 simply clicks on the billboard 804. A browser is opened, either as an overlay within the venue 100, or on a screen outside the venue 100, that provides the user with an opportunity to purchase the merchandise 902. In the illustration shown in FIGS. 8 and 9, the merchandise is a video game. However, one skilled in the art will appreciate that the merchandise could be any product that may be purchased, whether video games, movies, clothing, jewelry, electronics, etc. The types of products that may be linked to the billboard 804 are not limited. The billboards 804 may be selected for the purpose of linking the user to content outside of the venue 100, whether related or unrelated to the viewing experience within the venue 100, without interrupting or pausing the activities going on in the virtual social venue 100.

Figure 10:
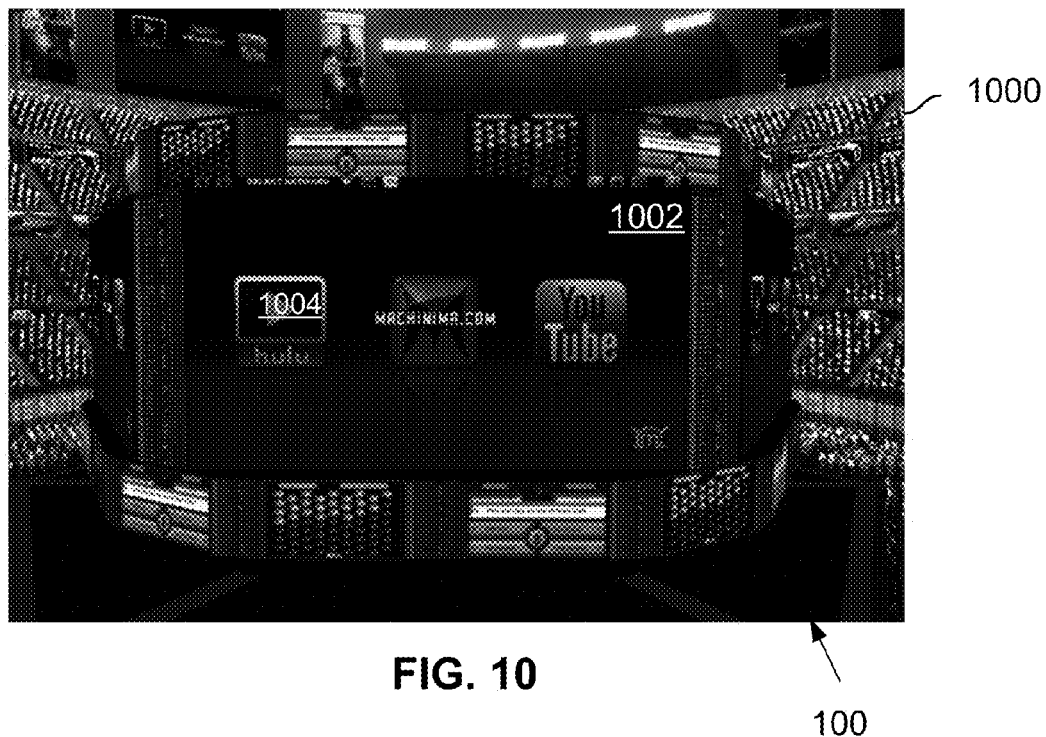
FIG. 10 is a screenshot of a multi-sided jumbotron centered in the virtual social venue of FIG. 1, one of whose viewing displays includes links to a plurality of selectable video feeds.

FIG. 10 illustrates a screen shot 1000 of a display 1002 viewable by users within the virtual social venue 100. In one embodiment, the display 1002 displays a plurality of video feed possibilities 1004, for instantiation into the video display 1002. As an example, video feeds from Hulu™, Machinima.com™ and YouTube™ are shown, although others are anticipated. Once a video feed 1004 is selected by a user (or moderator of a viewing experience), the web site associated with the video feed is presented within the display 1002.

Figure 11:
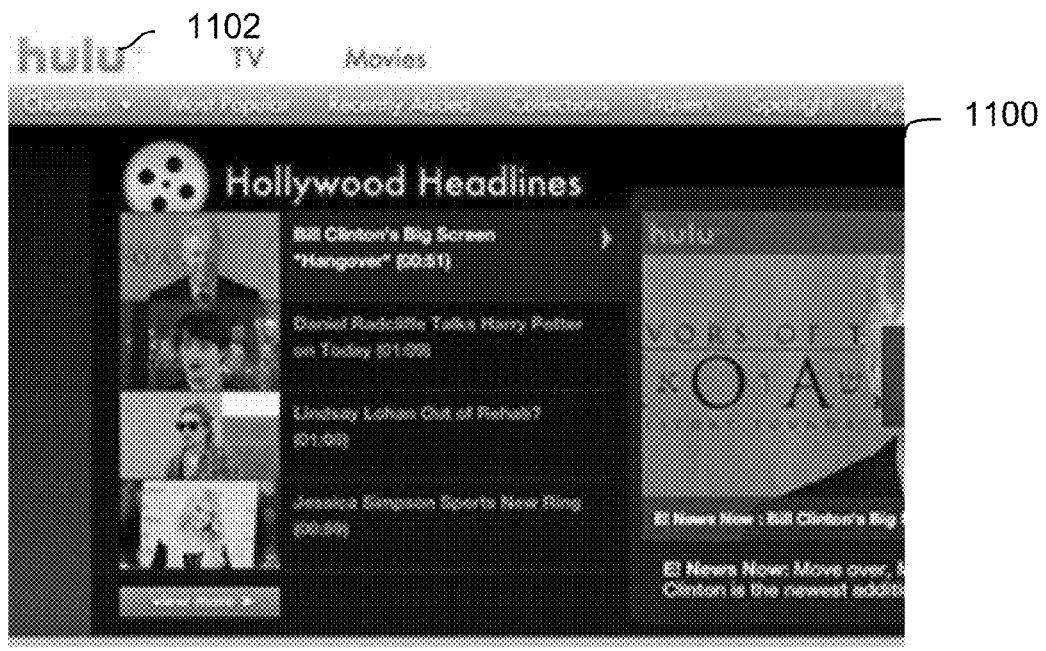
FIG. 11 depicts a video service selected to feed the viewing display of FIG. 10.

FIG. 11 illustrates a screen shot 1100 is shown of the display 1002 after the video feed 1004 for HULU® is selected. At this point, a user (or video moderator) can select a video feed. Once the video feed is selected, it begins playing on the display 1002 and is seen by the user that selected the video feed. More importantly, the content on the display 1002 is also viewable by everyone that is participating in the social venue. Thus, thousands or even millions of participants in the social venue experience the video feed that has been selected by the user. In one embodiment, the video feed is private to the user who selected the video feed. In another embodiment, the video feed is fed to everyone within the social venue. Alternatively, an administrator or moderator may select not only the video feed to be displayed, but also the group or subgroup of users within the social venue that can see the video feed.

In an additional embodiment, users that are selected, or otherwise able to view the video feed, can choose to move the video feed to any display, or the display of their choice, for experiencing the content. In this manner, a user can select one or more video feeds for populating displays within the social venue for the enjoyment of all or subgroups of users.

Figure 12:
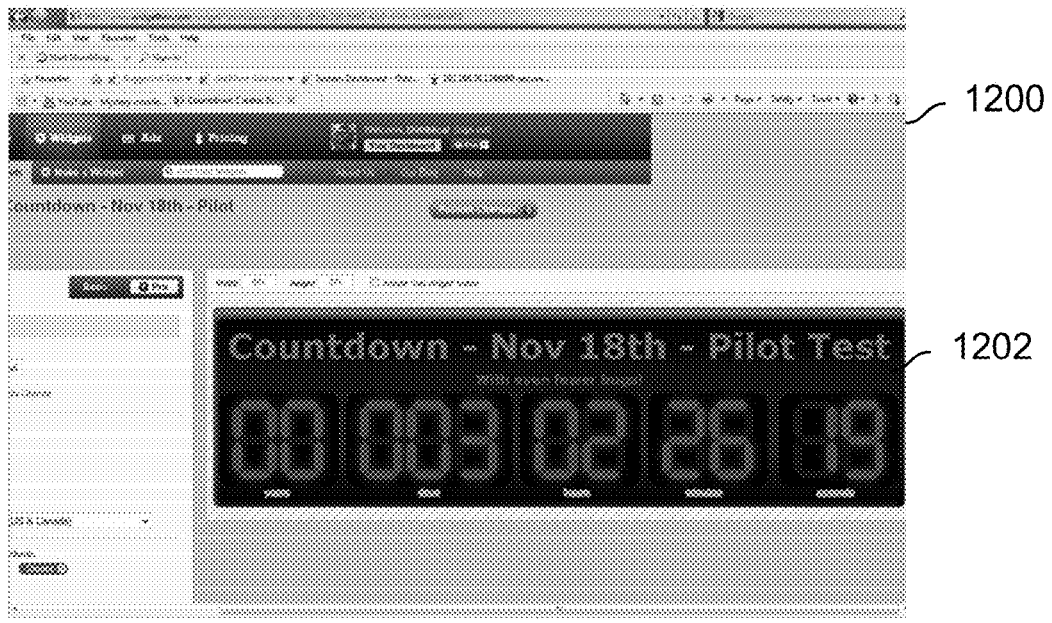
FIG. 12 is a screen shot of a web page containing a widget operable to be instantiated onto a display within the 3D virtual social venue of FIG. 1.

FIG. 12 illustrates a screen shot 1200 of a widget 1202 that has been created in a browser. In computer programming, a widget is an applet, "window gadget" or mini application, typically created using HTML, that forms an element or basic visual building block of a graphical user interface. A widget runs within a container, which is provided by a host program, or through a plugin. Like web pages, widgets are capable of many different things, often performing tasks that would be tedious or complicated for the user to access manually. Widgets can be as simple as a mini program that displays the time of day, or monitors stock quotes for selected companies, but may be more sophisticated, such as a mini program that monitors a user's real time score for players in a fantasy sporting league. For example, a widget might be designed to track betting odds for two sports teams, during a game. The betting widget could then be instantiated into a social venue that is playing the game, so that it continuously updates the odds for the users who desire to see it.

Figure 13:
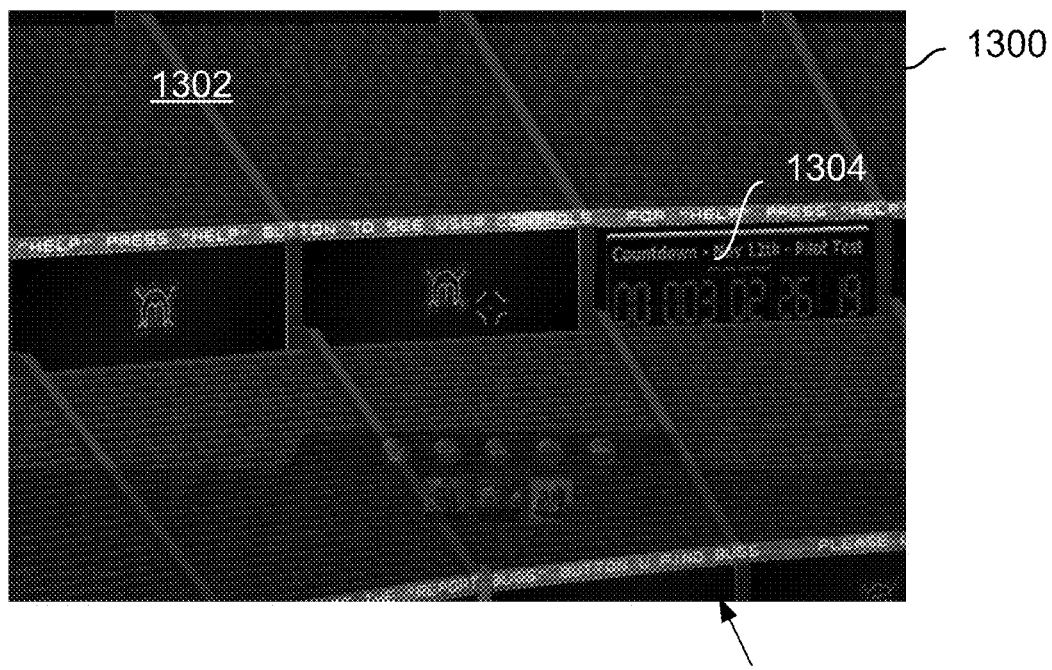
FIG. 13 is a screen shot of the widget of FIG. 12 instantiated onto a display surface within the 3D virtual social venue of FIG. 1.

In one embodiment, any widget that operable for use within an internet browser can be instantiated into one or more displays within the 3D social venue environment of the present invention. FIG. 13 illustrates a screen shot 1300 of a portion 1302 of the virtual social venue 100. Within the portion 1302 is a display 1304 onto which the widget 1202 has been instantiated. For each user viewing the instantiated widget 1202, the display of the widget is spatially transformed to match the relative positions and orientations of the viewing surface and user's avatar.

In one embodiment, a user (or venue moderator) can select one or more of the displays within the venue for display of any widget they desire. In addition, the user can selectively instantiate one or more widgets onto displays that are public or private. A public display is one that is visible to any user in the virtual social venue whose avatar has an unobstructed view of the viewing surface. A private display is one whose contents are individualized and exclusively visible to a single user, group, or subset of users in the virtual social venue. Multiple private widgets can be instantiated on a single private display, with each private widget being exclusively visible to different users, groups, or subsets of users within the virtual social venue.

Figure 14:
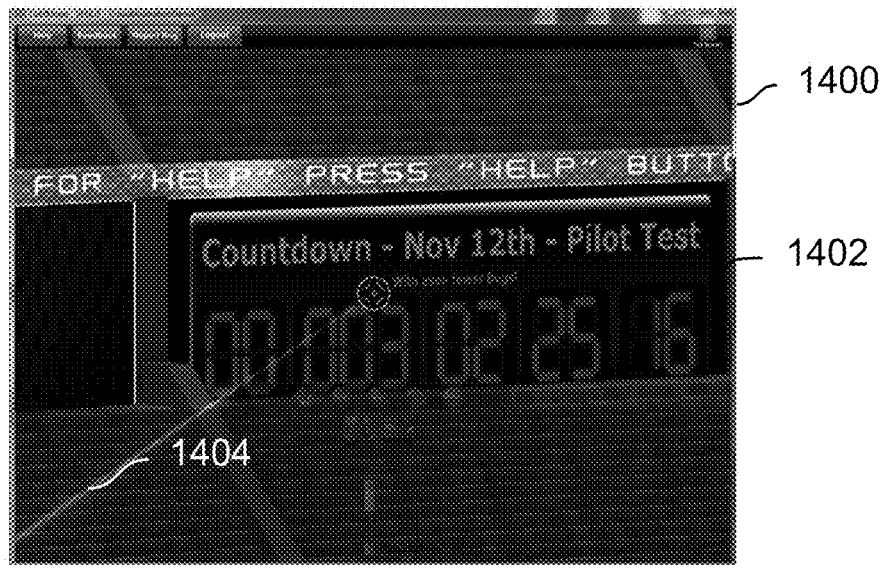
FIG. 14 is a screen shot of a virtual laser beam being pointed at a display surface inside the 3D virtual social venue of FIG. 1.

FIG. 14 illustrates a screen shot 1400 depicting a portion of the virtual social venue 100. A display is shown onto which a widget 1402 has been instantiated (as described above with respect to FIG. 13). In addition, a focused beam of light 1404 from a laser pointer is shown, pointed at an area within the widget 1402. In one embodiment, the laser is a user selectable tool provided within a platform providing the virtual social venue, to allow a user to identify an area within the venue to one or more users.

More specifically, a user can obtain a selection tool, such as a laser (or flashlight, or crosshairs, or any of a plurality of identifiers), and can then select a portion of the social venue for identifying to other users a location that they are to examine. The social media platform then superimposes a linear stream of light 1404 in the virtual social venue from the user's avatar to the object the user selects. The virtual social venue displays both the light stream 1404 and the surface area within the virtual social venue illuminated by the light stream 1404.

This enables users to direct the attention of other users within the virtual social venue to a particular portion of the virtual social venue. For example, if a group of users are looking for the avatar of a friend that is among the users within the social venue, and one of the users knows where the avatar is sitting, s/he can point to them using a selection tool, and all of the users in the group can see where the user is pointing.

As another example, a social venue may be set up for viewing a painting, or photograph, or other piece of art to be examined by a group of users. The instructor may zoom in to the painting, to a very granular, or pixel level, and can use a selection tool to direct the users to pay attention to a particular area that is being displayed. In one embodiment, the instructor controls the zooming experience of the other viewers. In another embodiment, each user individually controls the degree of zooming that is displayed to that user.

In another embodiment, users are provided with the ability to not only use a selection tool to call attention to a particular part of the social venue, but also select the users (for example, just the users' friends) to whom the selection tool is visible. In this manner, only selected users can see the selection tool, but other users cannot.

In another embodiment, each user is represented as a three-dimensional avatar having arms, hands, and a pointing finger, and the selection tool is the pointing finger of a user's avatar. Of course, many different types and uses of pointing devices are envisioned. What is relevant is that a user can choose a selection tool and then use that tool to call attention of other users within the social venue to a particular portion of the social venue.

Figure 15:
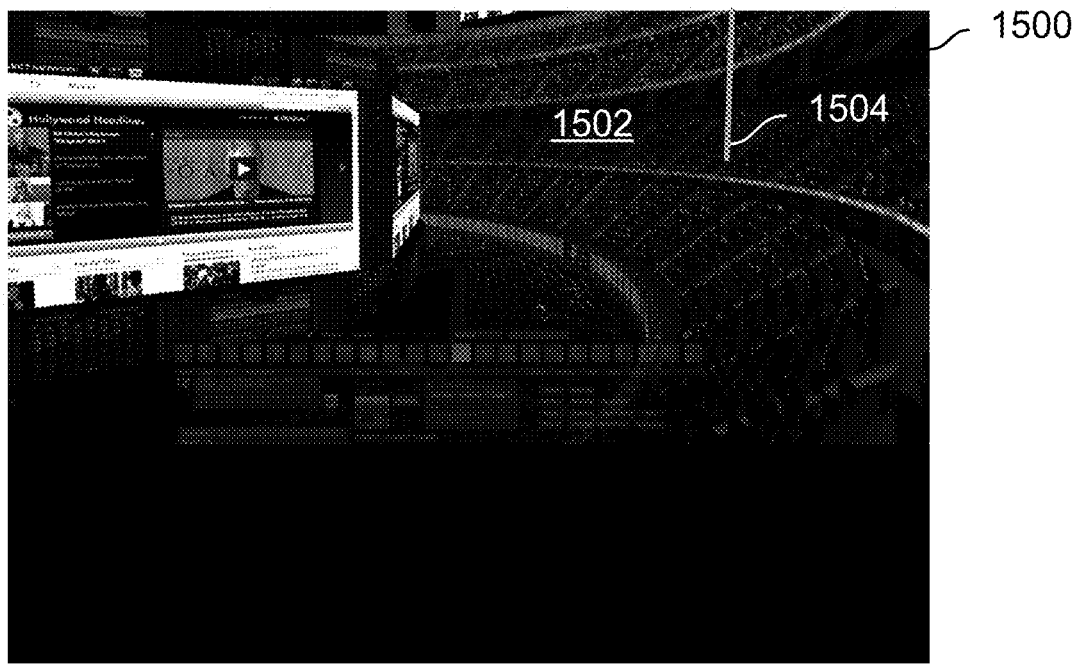
FIG. 15 is a screen shot of a visual overlay of digital communication to or from users within the virtual social venue of FIG. 1.

FIG. 15 illustrates a screen shot 1500 depicting a portion 1502 of the virtual social venue 100. Streams 1504 have been overlaid onto the social venue between users that are sending or receiving digital communications in the venue. For example, just as users in a physical venue may send or receive digital communication (texts, chats, emails, voice communications, etc.), users within the social venue may have similar forms of communication. In one embodiment, users can chat directly with one or more other users, either within the social venue, or to other users that are within their social network, but not a part of the current social venue viewing experience.

To allow users within the social venue to obtain a visual perspective of such communication, the present invention—preferably using the application programming interfaces of any linked extrinsic social networks—tracks the communications made by all users within the social venue, and provides visual overlays of the communications. In one embodiment, the communications comprise public posts or chat messages made by users in and through their extrinsic social network. In another embodiment, the communications comprise live voice communications between users in the social venue. The social media platform then displays visual overlays within the social venue to represent those communications to or from users in the social venue.

In one embodiment, the visual overlays are non-textual and comprise streams or ribbons of light. For example, if two users within the social venue are chatting with each other, streams of blue light will flow between the two users, depending on where they are sitting in the social venue, representing texts that are sent or received between the users. In addition, if a user receives a communication from someone in their social network that is outside the social venue, a red stream will drop down from outside the venue onto the user for which the communication is intended. In this manner, the visual overlays can be used to identify relatively more communicatively active parts of the social venue, while keeping private the contents of the communication. Moreover, different types of visual overlays are color-coded according to the type of digital communication occurring in the social venue.

In another embodiment, the digital communication is delayed briefly, so that the recipient does not actually receive the communication until after the stream representing the communication arrives. By observing streams of communications within the social venue, a user can readily see which users are actively communicating, either by receiving messages or sending them. Then users can migrate their avatars over to communicatively active parts of the social venue and participate in the action. Applicants envision any form of communication that can be monitored by the platform providing the virtual social venue 100 may be visually represented within the social venue in a graphical way.

In an alternative embodiment, text communications between users are captured and converted into audio and streamed into the virtual social venue so that they are audible to users proximate to a text-sending user. This way, as users migrate over to a communicatively active part of the virtual social forum, they also audibly experience the communicative activity.

Figure 16A:
FIGS. 16A-C are screen shots illustrating avatars on whose heads the users' profile images have been imported from the users' social networks.
Figure 16B:
Figure 16C:
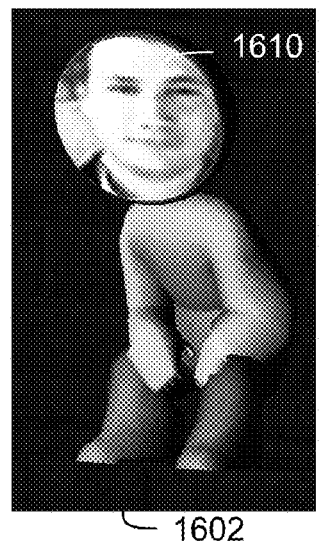

One embodiment of the present invention is also capable of extracting profile images of users who enter the virtual social venue from the social network(s) from which they are invited, and mapping the profile images onto the avatars of the corresponding users. FIGS. 16A-16C illustrate screen shots 1600-1604 depicting portions 1606 of a virtual social venue 100 in which profile images 1610 have been mapped onto users' avatars. The social media platform imports a graphical representation for each user, from his or her social network (e.g., FACEBOOK®), and overlays the graphical representation onto the user's associated avatar. In this manner, a user's virtual avatar is made personal to the user. The avatars are not simply objects which represent each user. Rather, each avatar is made personal to each user by overlaying on the avatar a user's own photograph or other graphical representation. In this manner, users within the social venue may be recognized, both by friends in their social network, as well as by others within the social venue.

In a typical embodiment, when a user joins the social venue, their graphical representation is imported from their social network, and overlaid onto an avatar that represents the user. While it will often be the case that a user's profile image will comprise a facial picture of the user, the profile image may be any graphical representation selected by the user. FIG. 16B illustrates a cartoon FIG. 1612 that one user selected as his profile image. It will be appreciated that a user's choice of graphical representation may be a picture of the user or any arbitrary image that they would like to use to represent themselves within their social network. For instance, a user may choose to instantiate a thumbnail sketch or icon of a website or other virtual social venue on their avatar.

The face of the avatar is just one of many surfaces that may be overlaid with extrinsically-sourced content. Users may also purchase apparel or body art to overlay other avatar surfaces. Also, the avatars themselves may be customized. A cola vendor could purchase 1000 seats in a football venue and choose cola cans or bottles or even animated cola commercials as their avatars. The cola avatars would emote and be influenced by the crowd.

In other embodiments, the invention enables users to designate video feeds to be mapped onto their corresponding avatars. In one embodiment, the video feed comprises streams of images captured from the users' web cameras. In another embodiment, the video feeds comprise streaming media content being shared in another virtual social venue. Other users can zoom into the mapped video feed and be transported to the other virtual social venue. In yet another embodiment, the video feeds comprise a video feed designated by a URL. In yet another embodiment, the video feeds comprise one or more advertisements. In yet another embodiment, the video feeds comprise a collage of images extracted from the users' one or more social networks.

Figure 17:
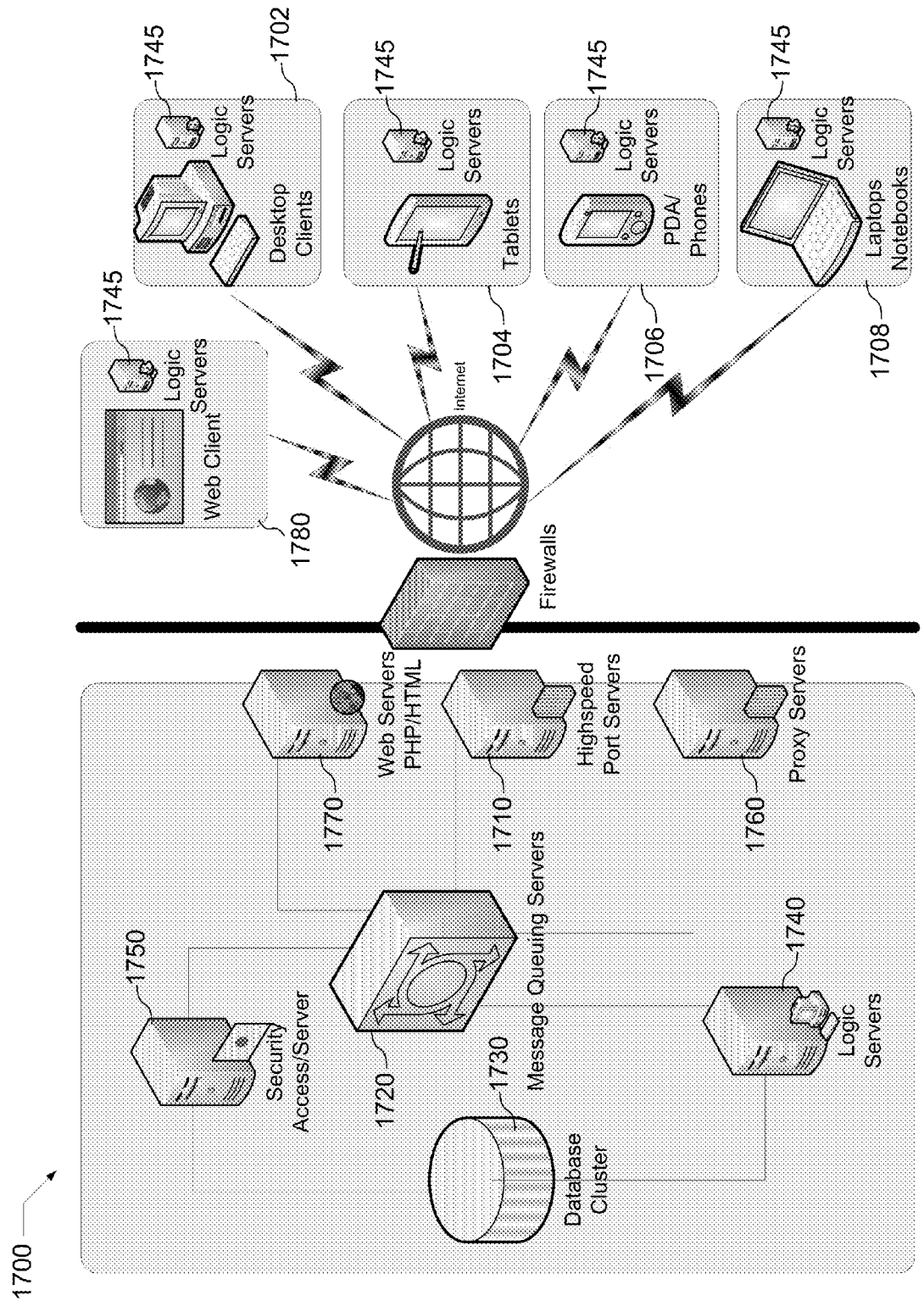
FIG. 17 is a block diagram of one embodiment of a social media platform for instantiating two-dimensional media content in a virtual social venue.

FIG. 17 is a block diagram of a server network embodiment of a social media platform 1700 for instantiating two-dimensional media content in a virtual social venue. The social media platform 1700 comprises a plurality of high speed port servers 1710, message queuing servers 1720, a database cluster 1730, logic servers 1740, security access servers 1750, proxy servers 1760, and web servers 1770. The social media platform 1700 further comprises local logic servers 1745 running through a web client 1780 and on a variety of client devices, including desktop clients 1702, tablets 1704, smartphones 1706, laptops and notebooks 1708, and any other processing device capable of accessing a network.

When a client logs into the social media platform 1700, the client communicates through port server 1710 to message queuing server 1720. The message queuing server 1720 talks to the security access/server 1750 to authenticate the login. Venue management is handled by logic servers 1740, through message queuing servers 1720, and local logic servers 1745 installed on each client device. Extrinsic two-dimensional media content (such as video streams) are fed directly from the third party's URL (e.g., Youtube) to clients. The remote logic server 1740 directs clients in the virtual social venue to the URL. The clients, with their local logic servers 1745, manage the extrinsic two-dimensional media content themselves, including transforming the media to fit the structural environment provided by the virtual social venue.

The client devices 1702, 1704, 1706, 1708 include a video display for presenting the instantiated media, within the context of the virtual social venue, to the user. The media may include video (movies, television, web cams, games), audio, still images, web browser content (web sites, web applications, widgets, computer data or applications), or any other content that may be accessed for display. User control of the client devices 1702, 1704, 1706, 1708 is achieved using input devices, such as a keyboard, mouse, or any other type of device.

Figure 18:
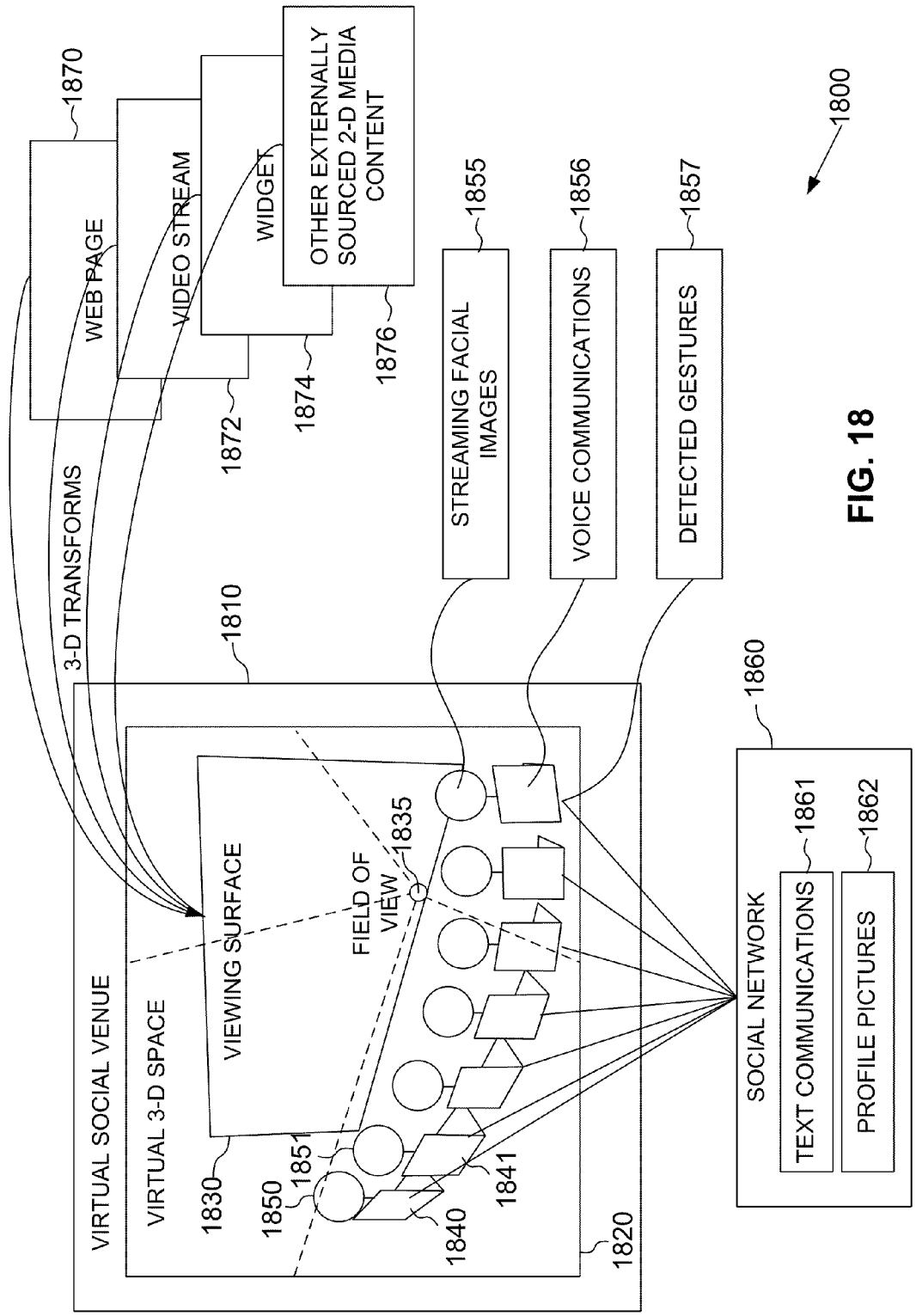
FIG. 18 is a block diagram that illustrates one embodiment of a social media platform that provides a virtual social venue including a virtual three dimensional space for sharing two-dimensional media content.

FIG. 18 is a block diagram that illustrates one embodiment of a social media platform 1800 that provides a virtual social venue 1810 including a virtual three dimensional space 1820 for sharing two-dimensional media content. The three dimensional space 1820 is typically a virtual three-dimensional representation of a large physical structure—such as a theater, stadium, coliseum, arena, stage, or conference center. The virtual representation provides one or more common seating or standing areas for an audience of virtual representations of people (e.g., avatars 1850, 1851, etc.) to sit or stand in proximity to one another. A three-dimensional graphics engine (not shown)—preferably one suitable for generating graphics for a massively multiplayer online game—is provided to generate the three-dimensional environment.

The shared two-dimensional media content is presented on one or more viewing surfaces 1830 within the virtual three-dimensional space 1820. FIG. 18 illustrates a virtual theater screen in a moderately-sized theater. FIGS. 1, 4, 7, 8, 10, and 13, by comparison, illustrate a plurality of virtual billboards and jumbotron screens in a large stadium. The shared two-dimensional media content may comprise a web page 1870, a video stream 1872, a widget 1874, or other externally sourced two-dimensional media content 1876.

When the shared two-dimensional media content comprises something that is interactive, such as a webpage with links and text fields, the social media platform 1800 enables a host user—or a user designated as a virtual disc jockey—to interact with the shared media content. Those interactions are displayed on the viewing surface 1830, along with the shared media content, to both the host user or virtual disc jockey and the other users admitted to the virtual social venue 1810. When the shared two-dimensional media content consists of web page, the social media platform 1800 is, in effect, instantiating a skinless web browser onto the viewing surface 1830 and scaling it, rotating it, skewing it, and otherwise three-dimensionally transforming it in a manner consistent with each admitted user's unique position and orientation within the virtual three-dimensional space 1820.

The virtual social venue 1810 is populated with users invited and admitted from one or more extrinsic social networks 1860. Users admitted to the social venue 1810 are either assigned a unique or exclusive position (e.g., a seat 1840, 1841, etc., or a standing location as shown in FIG. 2)

within the social venue 1810, or they are permitted to navigate and migrate through the social venue 1810 and select an unoccupied position from which to share the media experience. In either case, each user is provided with a unique position and orientation within the virtual three-dimensional space to experience the shared two-dimensional media content.

Each position and orientation within the virtual three-dimensional space has a different field of view 1835. Accordingly, the social media platform 1800 displays the shared two-dimensional media content to each user with a yaw and pitch consistent with the differences between the position and orientation provided to the user and the position and orientation of the virtual screen, window, or other viewing surface. To display the shared two-dimensional media content within this three-dimensional context, the social media platform 1800 three-dimensionally transforms the shared two-dimensional media content—often consisting of streaming video—in real time to each user in a manner consistent with each user's unique relative position and orientation.

FIG. 18 also illustrates the importation and mapping of other extrinsic content into the virtual social venue 1810. In one embodiment, profile pictures 1862 are imported from the one or more social networks 1860 and mapped onto the avatars 1850, 1851, etc., of admitted users. In another embodiment, streaming facial images 1855 are imported from users' web cams and mapped onto the corresponding avatars 1850, 1851, etc. As noted in the embodiment associated with FIG. 15, text communications 1861 may also be detected and/or imported from the one or more social networks 1860 and represented within the virtual three-dimensional space.

In another embodiment, voice communications 1856 (or other audio expressions of participating users) are imported from users' microphones or web cams and reproduced in the virtual three-dimensional space 1820 for other participants to hear. Preferably, the reproduction of sounds is done after filtering the audio expressions to cancel noises sourced from the virtual social venue, including the shared media content. Also, the audio expressions of surrounding participating users are reproduced for each user in a surround-sound scheme correlated and consistent with the relative spatial arrangement of the participating user with surrounding participating users. When a user's avatar turns around within the virtual social venue, the surround-sound is rotated to that user in a manner correlated and consistent with the relative rotation of the participating user's avatar within the virtual social venue. Also, consistent with the three-dimensional environment, the audio expressions received by any given recipient is attenuated and delayed as a function of the virtual distance between the recipient's avatar and the producer's avatar.

In yet another embodiment, detected motion gestures 1857—such as clapping and arm-waving—are imported from participating users' motion detecting apparatuses (e.g., MICROSOFT'S® KINECT® device or another third party gross motion, gesture, and/or emotion detecting device) and imitated through animations of their avatars. In this embodiment, each user who enters the virtual social venue 1810 is provided with a three-dimensional animated avatar that can render any of a plurality of emotional expressions with corresponding virtual physical gestures (e.g., jumping, arm-waving, cheering, booing, clapping).

Figure 19:
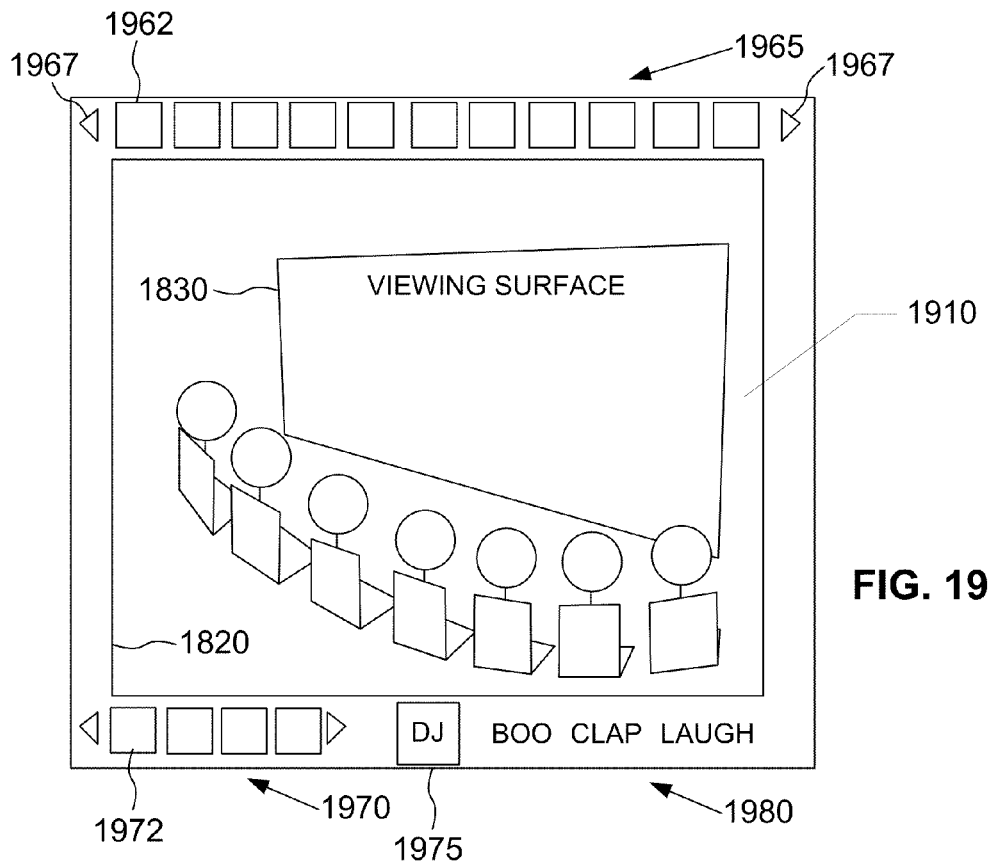
FIG. 19 illustrates one embodiment of a virtual social venue with toolbars for inviting friends, identifying admitted friends, identifying the virtual "disc jockey" of a social media event, and expressing emotional responses.

FIG. 19 illustrates one embodiment of a virtual social venue 1910 with toolbars for inviting friends, identifying admitted friends, identifying the virtual "disc jockey" of a social media event, and expressing emotional responses. Typically, a virtual social venue 1910 will be populated with users who are friends, or friends of friends, etc., of a host user.

To participate in the virtual social venue 1910, each user—including the host user—authorizes the social media platform 1800 to access information associated with the user's social network account, including the identities of friends. The social media platform 1800 uses this information to populate a friend toolbar 1965 with thumbnails 1962 of profile pictures of friends retrieved from a host user's one or more social networks. The thumbnails 1962 are arranged by alphabetical order of the corresponding friend's names. When a host user hovers their selection tool (e.g., mouse pointer) over a thumbnail 1962, the virtual social venue 1910 displays the corresponding friend's name. A host user can invite friends to join the virtual social venue by selecting the thumbnails 1962. Toolbar scroll arrows 1967 enable the host user to scroll through the thumbnail images 1962.

The social media platform 1800 also populates a guest toolbar 1970 with thumbnails 1972 of the profile pictures of users who accept the invitation and are admitted into the virtual social venue 1910. The social media platform 1800 also populates a larger box 1975 with the thumbnail image of the host user or virtual disc jockey—that is, the user who is controlling which media content to display and share on the viewing surface 1830. The social media platform 1800 also provides an "emot" toolbar 1980 comprising selectable text or icons with which users can indicate an emotional response (such as booing, clapping, or laughing) to the shared media content.

Figure 20:
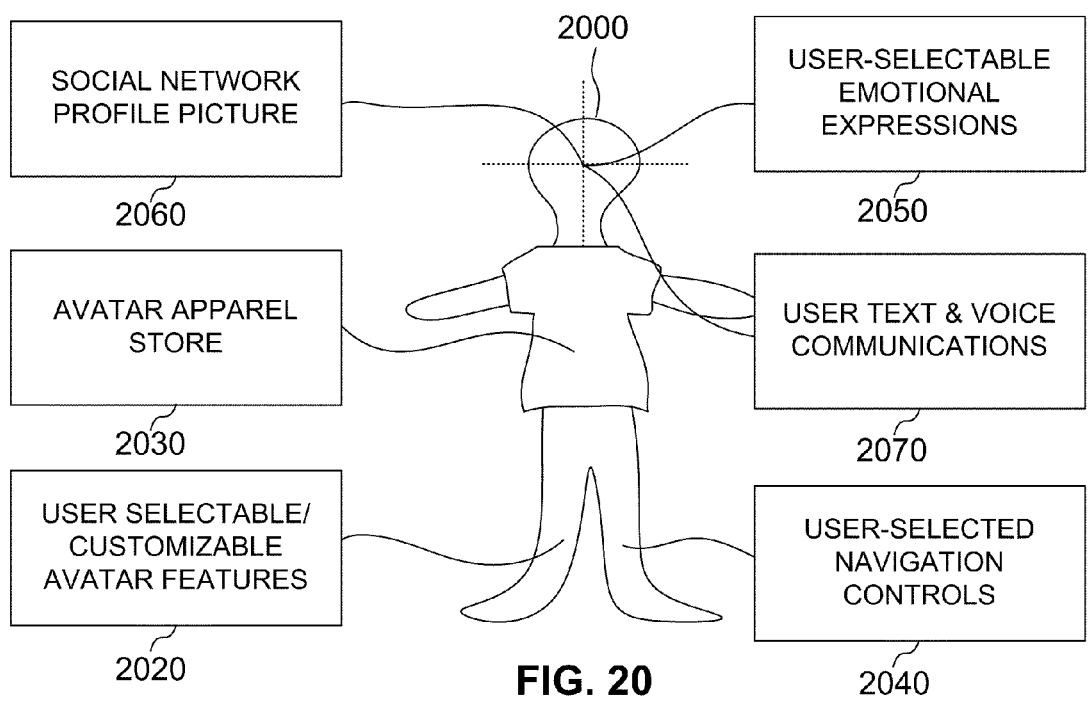
FIG. 20 is a block diagram illustrating feature customization for an avatar with multiple customizable features.

FIG. 20 is a block diagram illustrating feature customization for an avatar 2010 with multiple customizable features. As illustrated in function block 2020, users are provided with the ability to select an avatar 2010 and customize various avatar features, such as height, size, hair style, etc. Users may purchase fashionable virtual clothing from an avatar apparel store 2030 with which to clothe their avatar 2010. As illustrated in function block 2040, users may navigate their avatars 2010 to a selected position and orientation within a virtual social venue, and the avatar will animate in a manner (e.g., walking or turning) consistent with those navigation movements. As illustrated in function block 2050, users may also make their avatars 2010 gesture and express emotional responses. As illustrated in function block 2060, the user's social network profile picture may be mapped onto the avatar's face. And as illustrated in function block 2070, the user's voice and text communications may be represented by the avatar's facial and lip movements or by other representations (such as streams of light or text bubbles) in proximity to the avatar 2010.

Figure 21:
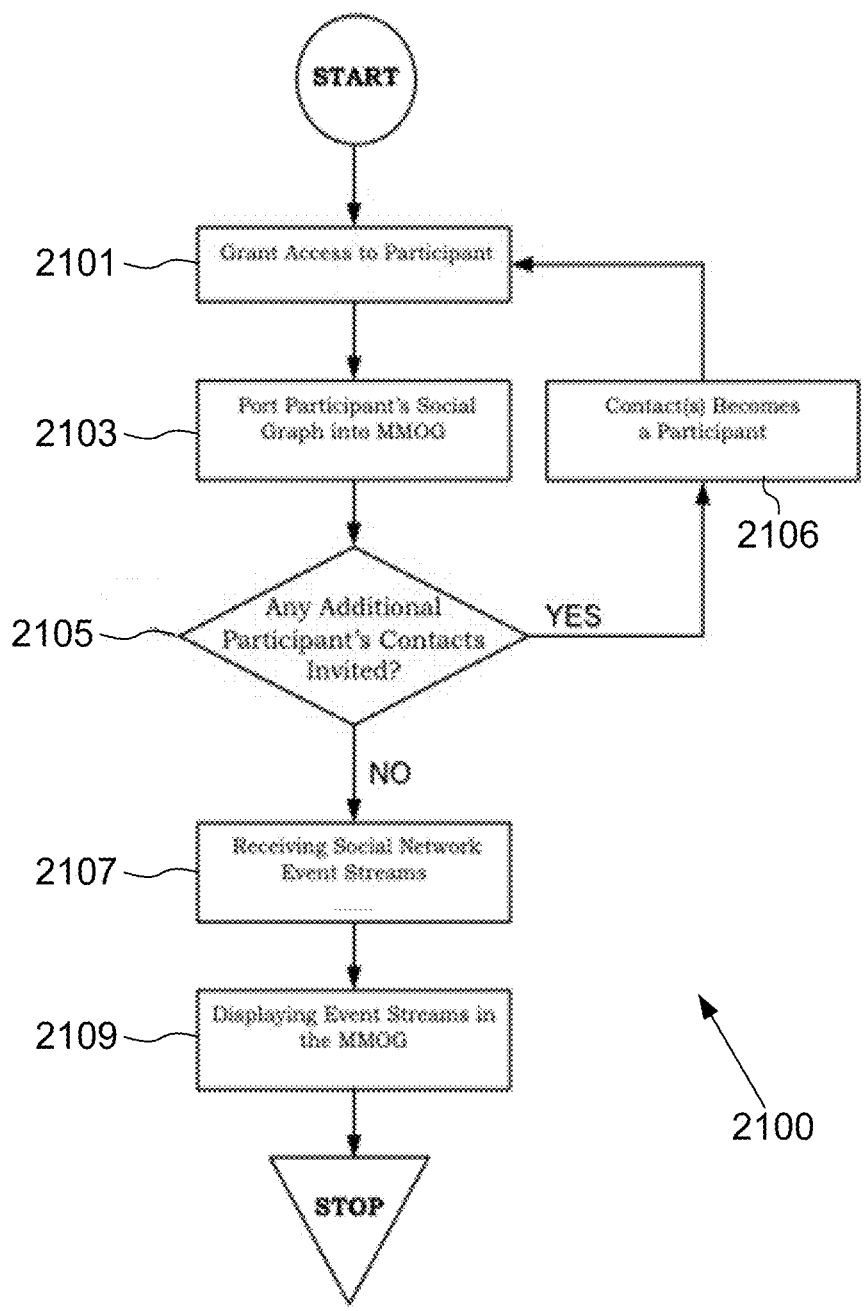
FIG. 21 is a flowchart of one embodiment of a process of integrating online social media events from one or more originating social media platforms into a social media platform.

FIG. 21 depicts one embodiment of a process 2100 of integrating social media into a social media platform. Process 2100 begins with granting access to a social venue within the social media platform to a participant through an entry point (operation 2101). In one embodiment, the entry point is a website dedicated to operating and managing the social media platform. This website can be generated by a social media module. Alternatively, the entry point can be a widget, banner, or other link within, or external to, one or more originating platforms online social media network with which the participant is associated. The participants may be associated with multiple social media networks. The entry point can be generated by a viral feature of the online social network. For example, an invitation from the participant to a contact to join in the social media platform can cause a link to be placed in the contact's inbox. Once the contact clicks on this link, he or she is granted access to the social venue within the social media platform. Other viral features may be used as an entry point to the social media platform such as newsfeeds and minifeeds generated within the originating social media platforms.

Once a participant is granted access to the social media platform, the participant's social graph having contacts information of the participant is automatically ported into the platform so that the viral features of the originating online social media network can be integrated with the social media platform (operation 2103). At operation 2105, the participant is prompted to invite one or more contacts from the participant's social graph to join in the combined social media platform. If any contacts accept the invitation, they become additional participants (operation 2106) and the process repeats. Social media events associated with the participants who joined in the MMOG can also be streamed into the social venue from their respective originating online social networks (operation 2107). These social media event streams may be displayed in real-time while the participants are interacting with the combined social media platform (operation 2109). In addition, the type and quantity of social media event streams received by an individual participant are user-configurable. The social media event streams may also be turned off at any time by each participant. Additionally, the social media events may be displayed on any display area within the combined social media platform. For example, the social media events may be displayed on a display screen or monitor, wall, billboard, blimp, rocket, airplane, or fireworks display within the combined social media platform, to name a few. This completes process 2100.

Figure 22:
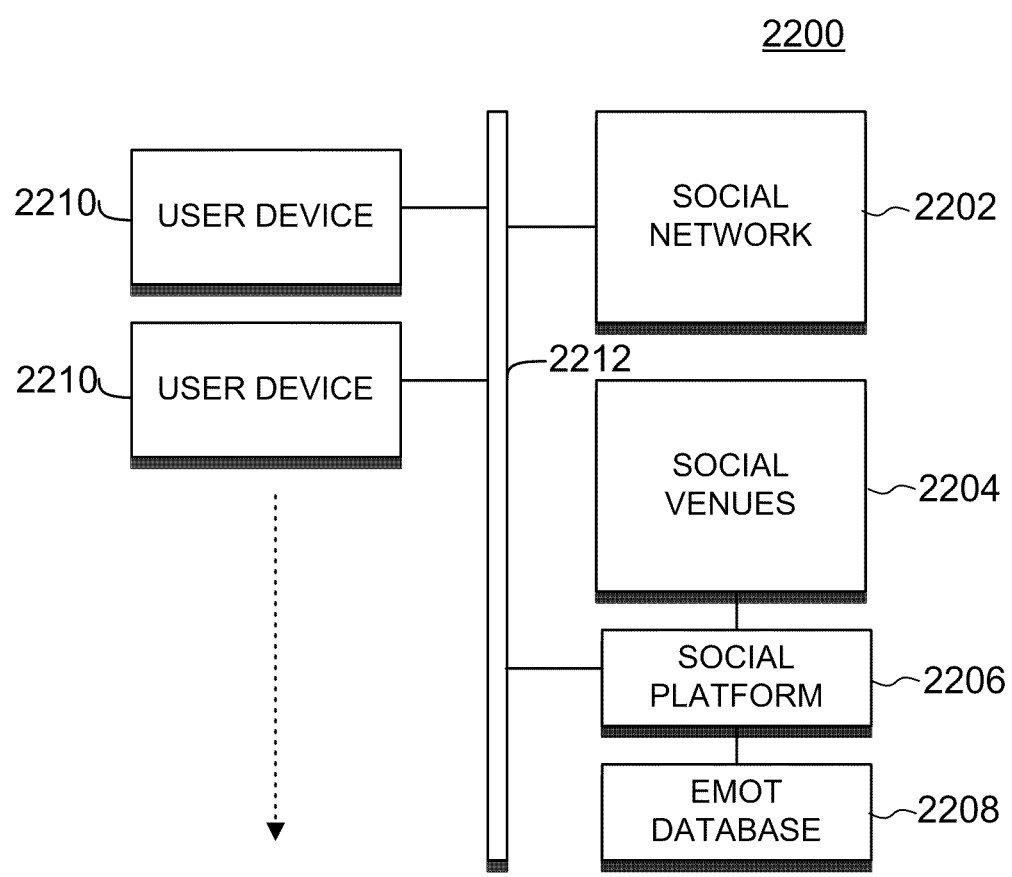
FIG. 22 is a block diagram of one embodiment of an architecture that enables a user's emotive activity to be recorded and played back to other users.

FIG. 22 is a block diagram illustrating one embodiment of an environment 2200 for a social media platform. More specifically, a social media platform 2206 is coupled to a network 2212. User devices 2210 are also coupled to the network 2212, and access social venues 2204 via the network 2212. When a user device logs into a social venue 2204, the social media platform 2206 imports metadata associated with the user of the user device 2210 from their profile in their social network 2202. This allows the graphical representation described above with respect to FIG. 16 to be displayed on the user's associated avatar.

As a user experiences content within their social venue 2204, they can choose to react to the content in many ways. They can clap, cheer, stand up, yell, boo, rate the video, etc. The social media platform 2206 records emotive activity of users over time during presentation of content played within a social venue and stores their emotive activity in an emot database 2208. The emotive activity correlates in time with the video content that is presented within the social venue. Since the emotive activity is recorded in sync with the content that is experienced, it is possible to reconstruct emotive activity of a user.

With this in mind, ghost avatars may exist within social venues 2204. More specifically, if content has been presented in a social venue 2204, and users have had emotive activity during presentation of the content, then the emotive activity is stored in the emot database 2208. If at a later time, the content is presented to other users, then ghost avatars from the previous viewing can appear within the social venue 2204, and their emotive activity can be presented alongside activity expressed by live users. Thus, the experience of viewing content can be cumulatively enhanced as more and more users view the content and their emotive activity is recorded. For example, a user might be viewing social content with only a few other live users. However, the social venue 2204 may have been previously viewed by thousands of others. In one embodiment, the cumulative emotive activity of all users that have viewed the content may be replayed along with the content, thus enhancing the overall viewing experience of the live users.

Figure 23:
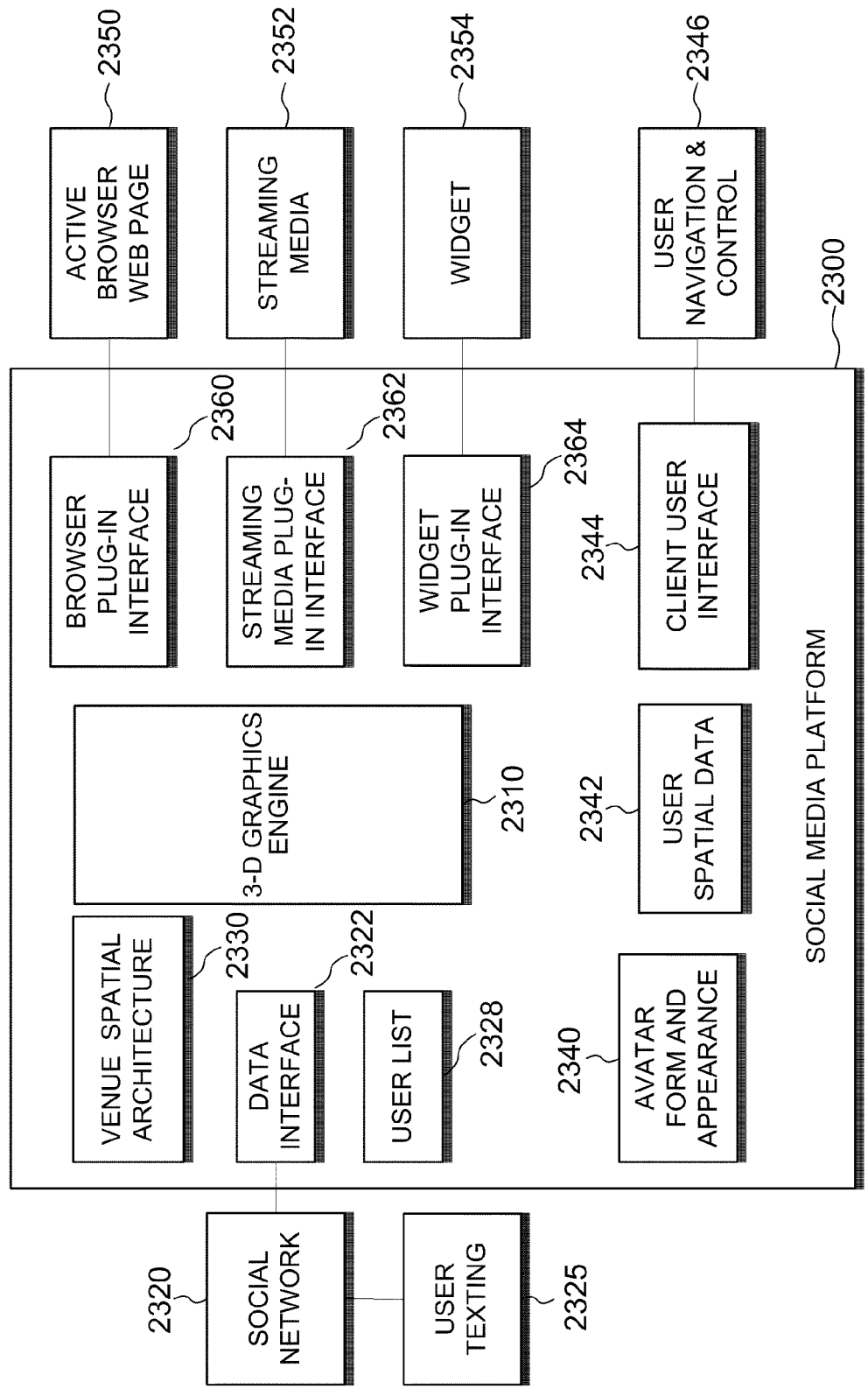
FIG. 23 is another functional block diagram of an embodiment of a social media platform for implementing a virtual social venue.

FIG. 23 is another functional block diagram of an embodiment of a social media platform 2300 for implementing a virtual social venue. The social media platform 2300 includes a three-dimensional graphics engine 2310 that generates the three-dimensional environment for the virtual social venue. The social media platform 2300 also includes a virtual representation of three-dimensional space—that is, a spatial architecture 2330 for the virtual social venue. The social media platform 2300 also provides customizable avatar form and appearance templates 2340, enabling users to adopt an avatar with a form and appearance to their liking.

The social media platform 2300 leverages the social relational data and communications facilities of extrinsic social networks to populate the virtual social venue and—in effect—to bring it to life. The social media platform 2300 includes one or more data interfaces 2322 to extrinsic social networks that use application programming interfaces associated with those social networks to authenticate users and pass and retrieve information (such as text communications and friend lists) to and from those social networks. Communications between admitted users, such as user texts or chats 2325, is preferably handled by the one or more extrinsic social networks and then represented in the virtual social venue in some form (such as text bubbles or streams of light).

The social media platform 2300 populates the virtual social venue with users invited and admitted from one or more social networks 2320. The social media platform 2300 includes a user list 2328 to track all of the users admitted to the social venue. The social media platform 2300 also continually tracks user spatial data 2342, such as the position and orientation of each user's avatar, as various users navigate and migrate about the venue social venue.

The social media platform 2300 also leverages media content sourced from extrinsic media providers. The social media platform 2300 includes a browser plug-in interface 2360 enabling an interactive browser web page 2350 to be instantiated (with its interactive features maintained) onto a viewing surface within the three-dimensional environment provided by the virtual social venue. The social media platform 2300 also includes a streaming media interface 2362 enabling streaming media content 2352 from a third party streaming media provider to be instantiated within the three-dimensional environment. The social media platform 2300 also includes a widget interface 2364 enabling a widget 2354 to execute within the three-dimensional environment.

The social media platform 2300 also includes a client user interface 2344 for presenting the virtual social venue to a client and receiving and responding to user navigation and control 2346. User navigation and controls 2346 include commands related to the navigation of a user's avatar, selection of friends to invite to the virtual social venue, and emotional responses to the third party media content.

Figure 24:
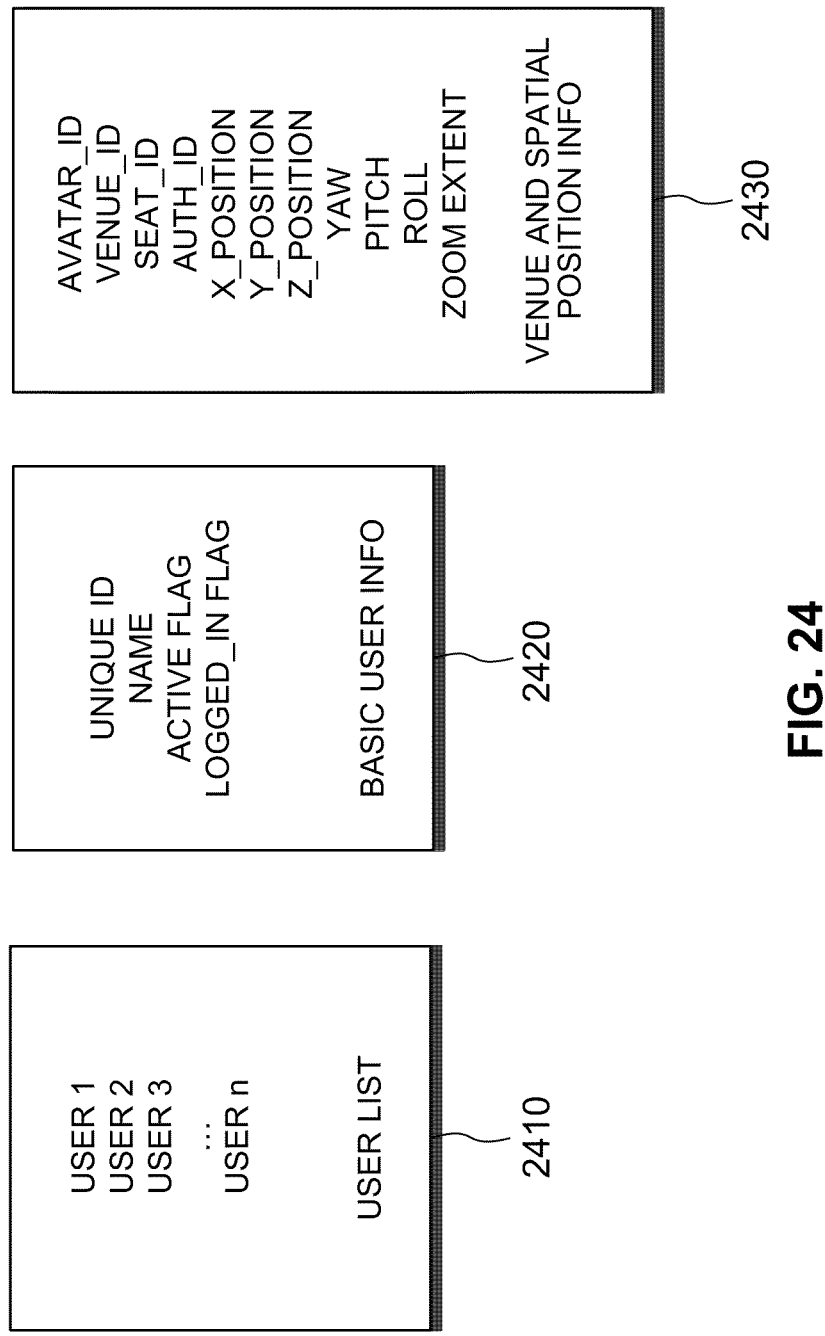
FIG. 24 is a block diagram of user-related data maintained by one embodiment of the social media platform.

FIG. 24 is a block diagram 2400 of user-related data maintained by one embodiment of the social media platform 2300. The social media platform 2300 includes a user list 2410 identifying each user admitted to or participating in a virtual social venue. The social media platform 2300 also includes, for each user, a basic user information record 2420 including fields for the user's unique id, profile name, and Boolean flags indicating whether the user is active and/or logged in. The social media platform 2300 also maintains a record 2430 identifying information related to the location and spatial position of each user's avatar. This includes an avatar ID, a venue ID, seat ID, authorization ID, X, Y, and Z position, as well as the yaw, pitch, roll, and relative zoom extent of the user's field of view.

Figure 25:
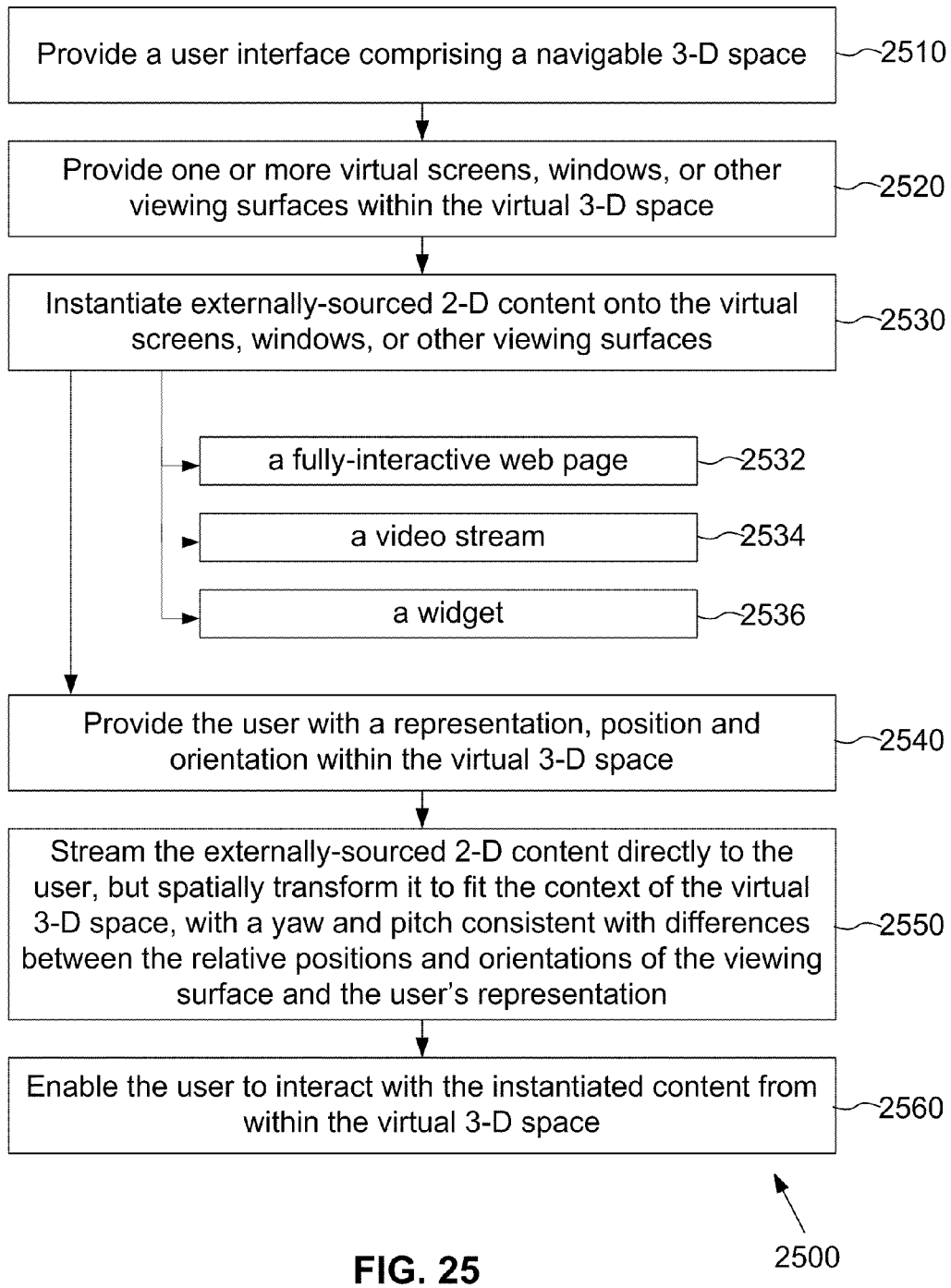
FIG. 25 is a functional block diagram of one embodiment of a method for instantiating two-dimensional media content in a three-dimensional platform.

FIG. 25 is a functional block diagram 2500 of one embodiment of a method for instantiating two-dimensional media content in a three-dimensional platform. Functional block 2510 provides a user interface comprising a navigable three-dimensional space. Functional block 2520 provides one or more virtual screens, windows, or other viewing surfaces within the virtual three-dimensional space. Functional block 2530 instantiates externally-sourced two-dimensional content onto the virtual screens, windows, or other viewing surfaces. The two-dimensional content may comprise a fully-interactive web page 2532, a video stream 2534, a widget 2536, or some other content.

Functional block 2540 provides the user with a representation, position and orientation within the virtual three-dimensional space. The representation of the user is typically in the form of an avatar. The avatar's position (e.g., a seat or standing location) may be automatically determined, selected and assigned by the host, or the user may be given the ability and privilege to navigate his/her avatar to a user-selected position within the virtual three-dimensional space. The user is also provided with the ability to rotate the avatar or the avatar's head to a selected orientation within the virtual three-dimensional space. The user is provided with a field of view consistent with the selected position and orientation of the user's avatar (or other representation) within the virtual three-dimensional space.

Function block 2550 drives the externally-sourced two-dimensional content directly from the third party provider to each user. The two-dimensional content is spatially transformed (preferably using rendering software installed on each user's machine) to fit the context of the virtual three-dimensional space. This includes transforming the two-dimensional content to a yaw and pitch consistent with the relative orientations and positions of each user and viewing surface. If any portion of the virtual screen, window, or other viewing surface is within a user's field of view, that portion of the instantiated two-dimensional media content will be displayed to that user.

Function block 2560 maintains any ability to interact with the instantiated content within the three-dimensional environment. For example, if a web page with text fields and links is instantiated on the virtual screen, window, or other viewing surface, then the user is able to interact with the instantiated web page from within the virtual three-dimensional space. This includes enabling the user to type into the text field and to select any link on the web page from within the virtual three-dimensional space.

Figure 26:
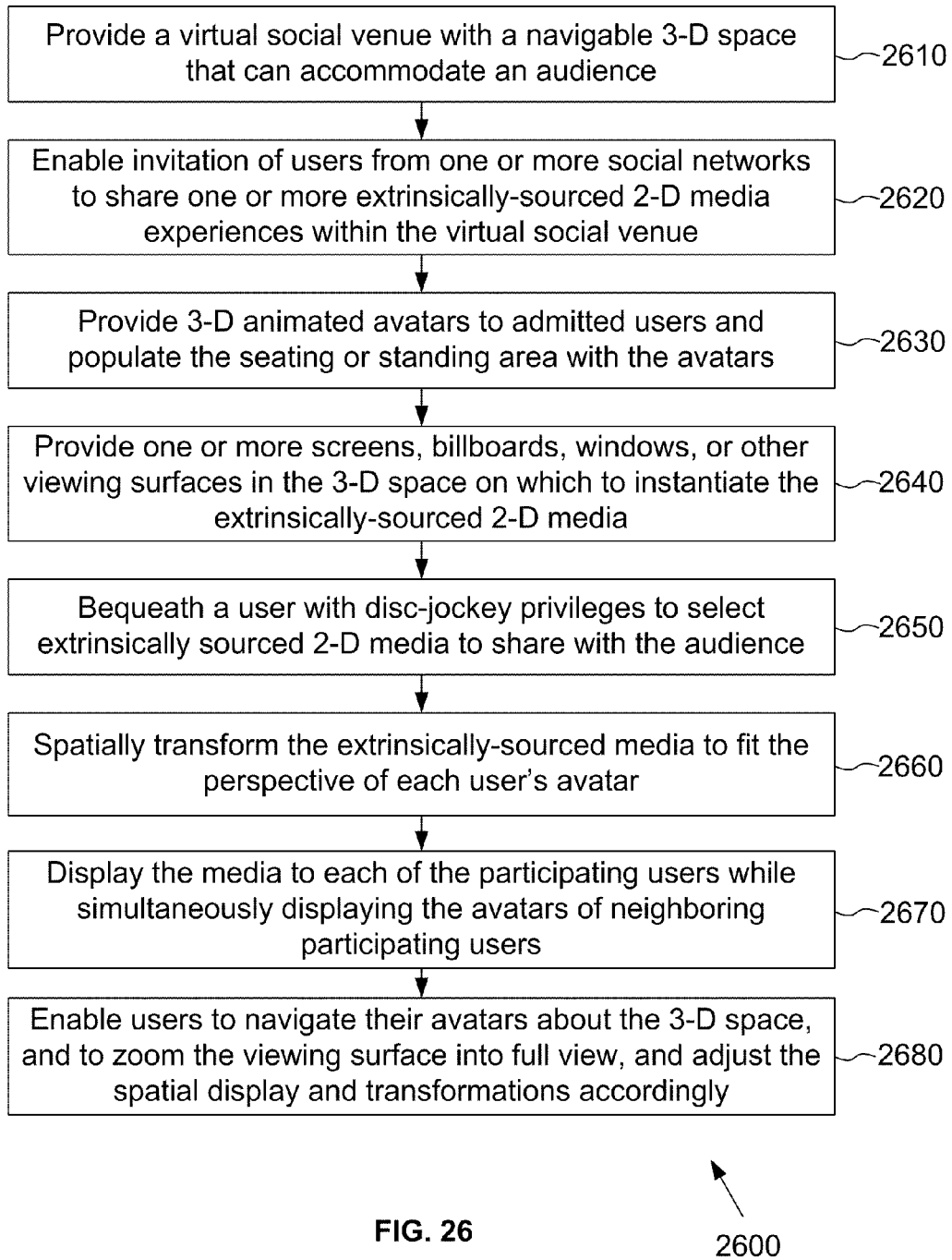
FIG. 26 is a functional block diagram of one embodiment of a method for sharing two-dimensional media content with users from a social network in a three-dimensional platform.

FIG. 26 is a functional block diagram 2600 of one embodiment of a method for sharing two-dimensional media content with users from a social network in a three-dimensional platform. Functional block 2610 provides a virtual social venue comprising a navigable three-dimensional space. The three-dimensional space typically includes a large physical structure that provides one or more seating or standing areas for an audience of virtual representations of people (e.g., avatars) to sit or stand in proximity to one another.

Functional block 2620 provides the ability to invite users from the social network to participate in the virtual social venue. This ability may be limited to a single host user or extended to multiple hosts or even to all users, until the social venue reaches its admittance capacity. Functional block 2630 provides three-dimensional animated avatars to admitted users and populates the seating or standing area with the avatars.

Functional block 2630 provides one or more screens, billboards, windows, or other viewing surfaces in the three-dimensional space on which to instantiate the extrinsically-sourced two-dimensional media. Functional block 2650 bequeaths a user with disc-jockey privileges over typically just one of the screens, billboards, windows, or viewing surfaces. A user with disc-jockey privileges controls and selects the extrinsically-sourced two-dimensional media content to share with the audience on the viewing surface the disc jockey controls. The disc jockey can also interact with the instantiated media content from within the virtual three-dimensional space. Typically, other viewing surfaces will be occupied by advertisements related either to the content to be shown or to one or more users' consumer interests.

Functional block 2660 spatially transforms the extrinsically-sourced media to fit the perspective of each user's avatar. As noted before, each avatar has a unique position and corresponding field of view from within the virtual social venue. Functional block 2470 displays the extrinsically-sourced media while simultaneously displaying the avatars of neighboring participating users to each of the participating users. In other words, the virtual social venue and any instantiated media content is displayed to each avatar from that avatar's unique perspective and field of view. This includes transforming the instantiated media content to a yaw and pitch consistent with the relative orientations and positions of each user's avatar to the viewing surface.

Functional block 2680 enables users to navigate about the three-dimensional space, and to zoom the viewing surface into full view, while adjusting the spatial display and three-dimensional transformations accordingly. Simply by turning the scroll wheel of a mouse, a user can zoom in from the default perspective that his/her avatar would have in the virtual social venue to a view in which the instantiated media content is full-screen and orthogonal (no longer three-dimensionally transformed). By turning the scroll wheel of the mouse in the opposite direction, the user can zoom back out, all the way from a full-screen view back to the default perspective. In a preferred embodiment, the user can continue to zoom out from the default position, giving the user a view of not only the objects in front of the user's avatar, but also the user's avatar itself and the surrounding context. These tools enhance the user's control over and potential appreciation of the social experience in sharing the instantiated media content.

It will be understood by those skilled in the art that various embodiments are implemented on computer hardware, software, firmware, and combinations thereof. The teachings of this description can be adapted to a variety of computer architectures. The various functions of the illustrated embodiments are implemented through programs of instructions stored in memory and configured to execute on various computer processors.

Having thus described exemplary embodiments of the present invention, it should be noted that the foregoing disclosure and associated drawings are exemplary only, and that various other alternatives, adaptations, and modifications may be made within the scope of the present invention. Accordingly, the present invention is not limited to the specific embodiments illustrated herein, but is limited only by the following claims.

We claim:

1. A computer-implemented method for visualizing communications in a social setting, the method comprising:
   providing a graphical virtual 3D environment for sharing a social experience between users invited to participate in the virtual 3D environment;
   enabling the invitation of users of a third party social network to enter the 3D environment;
   graphically representing each user who enters the 3D environment with a 3D avatar;
   enabling intra-environment communications between users within the 3D environment and trans-environment communications between users in the 3D environment and users who are neither participating in the 3D environment nor represented with an avatar within the 3D environment;
   tracking both the intra-environment communications and trans-environment communications; and
   displaying visual overlays within the 3D environment to represent intra-environment communications and trans-environment communications to or from users in the 3D environment, wherein the visual overlays signify a communicatively active part of the 3D environment while keeping private the contents of the communication,
   wherein intra-environment communications between users within the 3D environment are represented by horizontal ribbons between the users and trans-environment communications between a user within the 3D environment and a party outside of the 3D environment are represented by ribbons that drop down from outside of the 3D environment onto the user within the 3D environment for which the communication is intended.

2. The method of claim 1, wherein the 3D environment is a virtual three-dimensional representation of a stadium, coliseum, arena, stage, theater, or other physical structure providing a seating or standing area for seating or standing a plurality of people in proximity to each other to view and/or listen to streaming media content.

3. The computer-implemented method of claim 1, further comprising:
   enabling users within the 3D environment to migrate their avatars over to communicatively active parts of the 3D environment.

4. The computer-implemented method of claim 1, wherein at least some of the intra-communications comprise live voice communications to or from users within the 3D environment.

5. The computer-implemented method of claim 4, further comprising:
   enabling users within the 3D environment to migrate their avatars over to communicatively active parts of the social venue; and
   making the intra-communications audible to users whose avatars are proximate to the communicatively active part of the 3D environment.

6. The computer-implemented method of claim 1, wherein at least some of the intra-communications comprise live text communications to or from users within the 3D environment.

7. The computer-implemented method of claim 6, further comprising converting the text communications to audio and making the converted audio communications audible to users proximate to a text-sending user.

8. The method of claim 1, wherein when two users within the 3D environment communicate with each other, the visual overlay comprises a representation of a stream or ribbon that connects or flows between them.

9. The method of claim 8, wherein the stream or ribbon is of light.

10. The method of claim 1, further comprising:
    representing trans-environment communications with a vertical stream or ribbon that drops down from outside the 3D environment onto the user for which the communication is intended.

11. The method of claim 1, further comprising presenting streaming media content from a third party streaming media content provider to users in the 3D environment.

12. The computer-implemented method of claim 1, wherein the visual overlays are color-coded according to the type of digital communication occurring in the 3D environment.

13. The computer-implemented method of claim 1, wherein the visual overlays comprise non-textual ribbons or streams that connect or flow between communicating users.

14. The computer-implemented method of claim 1, wherein the communications between users are made within the third party social network but tracked to enable the visual overlays.

* * * * *